United States Patent

Ishikawa et al.

[11] Patent Number: 5,810,464
[45] Date of Patent: Sep. 22, 1998

[54] SURFACE LIGHT SOURCE DEVICE OF SIDE LIGHT TYPE

[75] Inventors: Tsuyoshi Ishikawa, Tokyo; Kayoko Watai; Kazuaki Yokoyama, both of Saitama, all of Japan

[73] Assignees: Enplas Corporation, Kawaguchi; Yasuhiro Koike, Yokohama, both of Japan

[21] Appl. No.: 595,503

[22] Filed: Feb. 1, 1996

[30] Foreign Application Priority Data

Feb. 3, 1995 [JP] Japan .................................. 7-037786

[51] Int. Cl.$^6$ ........................................ F21V 8/00
[52] U.S. Cl. ........................... 362/31; 362/327; 362/330; 362/331; 349/65; 385/146
[58] Field of Search ................. 362/31, 330, 26, 362/27, 268, 327, 328, 331; 349/65, 70, 64, 67; 385/146

[56] References Cited

U.S. PATENT DOCUMENTS

| | | | |
|---|---|---|---|
| 4,909,604 | 3/1990 | Kobayashi et al. | 362/31 |
| 4,914,553 | 4/1990 | Hamada et al. | 349/65 |
| 5,271,077 | 12/1993 | Brockman et al. | 385/146 |
| 5,303,322 | 4/1994 | Winston et al. | 385/146 |
| 5,402,324 | 3/1995 | Yokoyama et al. | 362/31 |
| 5,575,549 | 11/1996 | Ishikawa et al. | 362/31 |

OTHER PUBLICATIONS

English language Abstract & Japanese Patent No. 2–13925, of Hidesuke Endo, issued Jan. 18, 1990.
English language Abstract & Japanese Patent No. 2–221924, of Hidetoshi Innami, issued Sep. 4, 1990.
English language Abstract & Japanese Patent No. 2–221925, of Hidetoshi Innami, issued Sep. 4, 1990.
English language Abstract & Japanese Patent No. 2–221926, of Hidetoshi Innami, issued Sep. 4, 1990.
English language Abstract & Japanese Patent No. 2–245787, of Takeshi Saito, issued Oct. 1, 1990.

*Primary Examiner*—Alan Cariaso
*Attorney, Agent, or Firm*—Staas & Halsey

[57] ABSTRACT

A surface light source device of side light type controls the intensity of light rays emitted therefrom. The surface light source device of side light type comprises a light scattering guide 20 having a light incidence surface 22, a light emission surface 23 and an inclined surface 25. The device further includes a primary light source L arranged around one side of the light incidence surface 22, a silver foil R surrounding the primary light source L, a prism sheet 4 arranged along the light emission surface 23, and a silver foil S arranged along the inclined surface 25. The inclined surface 25 of the light scattering guide 20 composed of three sections I, II and III. The section I is a convex cylindrical surface section having a radius of curvature of 330 mm. The tangential direction at the end of the guide on the side of the light incidence surface 22 is parallel to the light emission surface 23. The tangential direction at the boundary between the sections I and II is inclined at an angle 4° with respect to the light emission surface 23. The sections II and III are straight sections whose inclinations are 4° and 3.6° with respect to the light emission surface 23, respectively. The distribution of emitted light intensity from the surface light source device has a higher luminance around its center. Various distributions of emitted light intensity are provided by varying the transition of inclinations of the inclined surface (particularly refer to FIG. 13).

8 Claims, 16 Drawing Sheets

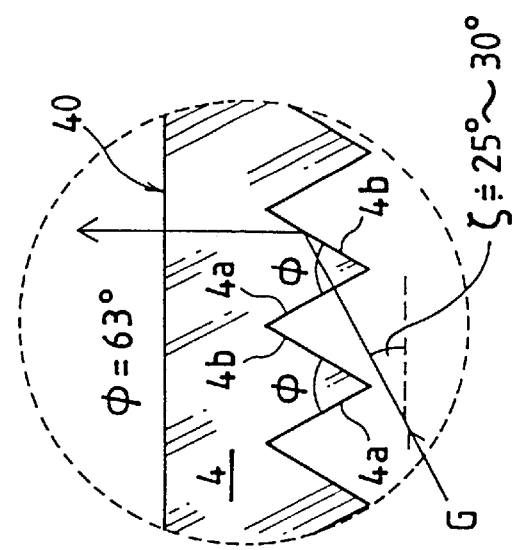
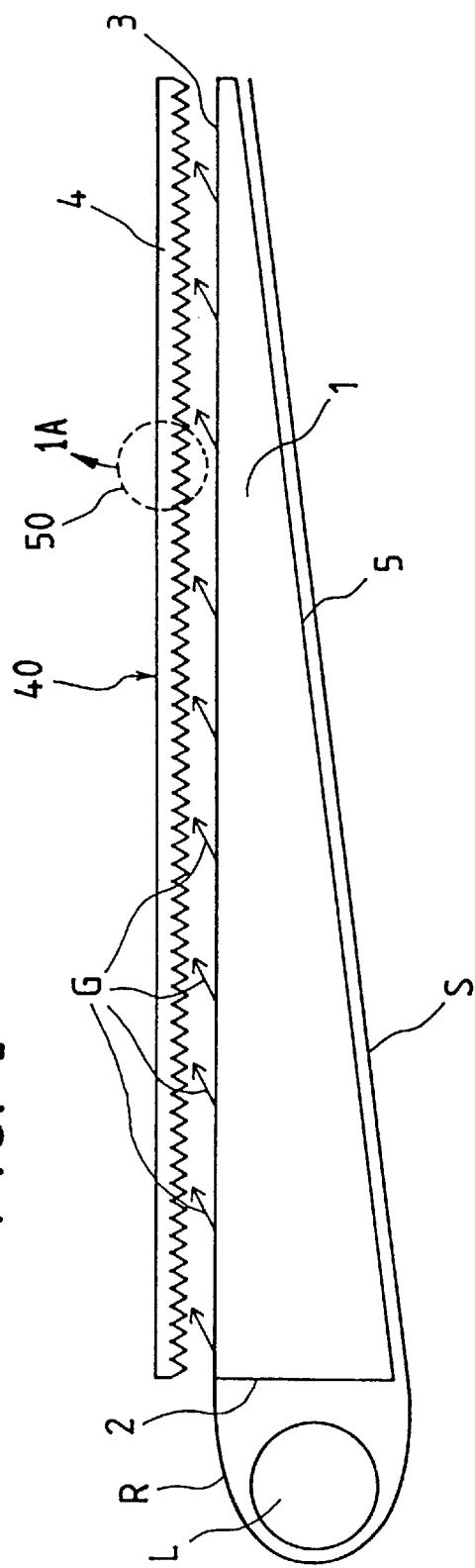

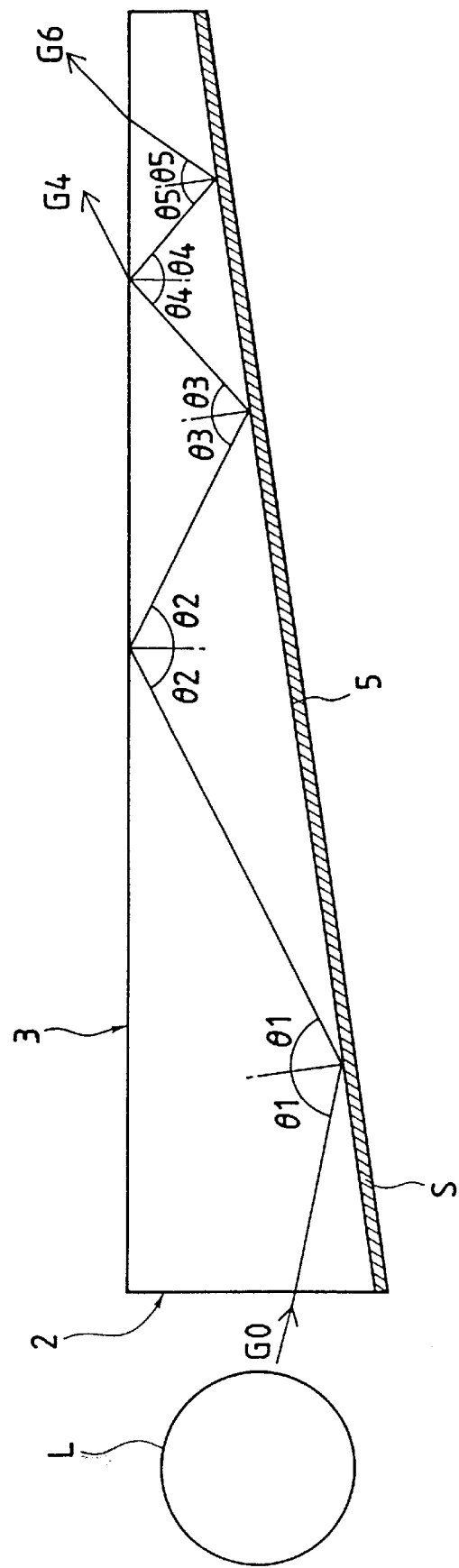

SURFACE LIGHT SOURCE DEVICE OF SIDE LIGHT TYPE

FIELD OF THE INVENTION

The present invention relates to a surface light source device of side light type having a plate-shaped light scattering guide and a primary light source arranged around one side of the light scattering guide, and more particularly to a surface light source device of side light type which provides illumination light rays having an intentional distribution of intensity and is advantageously applicable to back lighting for liquid crystal displays requiring a distributed brightness on its screen.

RELATED ARTS

Optical elements or devices for directing emitted light in a desired direction with the aid of scattering phenomenon have been known and have been applied to back lighting of liquid crystal displays.

For example, according to the devices disclosed in Japanese Patent Application Laid-open Nos. 2-13925 and 2-245787, a primary light source is arranged around one side of a transparent light guide plate having a major surface along which a reflector element is arranged and light diffusion is caused on the other major surface (light emission surface) or in the proximity thereof to form a surface light source.

With these technical means, light propagating directions are expanded by utilizing the diffuse reflection or specular reflection occurring around the light emission surface of the light guide plate or at reflector element and illumination rays are emitted out of the light guide plate. However, since no light scattering is volumetrically caused in the light guide plate, it is difficult to obtain a high efficiency in producing illumination rays.

According to other known technical means as disclosed in Japanese Patent Application Laid-open Nos. 2-221924, 2-221925 and 2-221926, a light guide plate is used, whose transparent material includes particulate substances dispersed therein having refractive indexes different from that of the transparent material. Inside such a light guide, conversion of light propagation directions is caused in a volumetric region by scattering to increase the light rays directing toward a major surface (light emission surface).

With a surface light source device of side light type having a primary light source arranged around one side of the light guide plate described above, there is generally a tendency of its luminance to be relatively lower in a zone relatively remoter from the light incidence surface (surface facing to the primary light source) of the light guide plate. Hitherto, most attempts and efforts have aimed to eliminate this tendency and to provide a light source having a characteristic in that the entire luminance of a light emission surface does not vary depending on the distance from the light incidence surface (flat distribution of emitted light intensity).

In the Japanese Patent Application Laid-open Nos. 2-221924, 2-221925 and 2-221926, for example, diameters and/or concentrations of the particles having different refractive indexes to be dispersed in the light guide plate are increased with an increase in distance from the primary light source. However, such a light guide plate having a gradient in diameter or concentration of particles is difficult to produce and unsuitable for mass-production and hence economically disadvantageous.

In order to eliminate the disadvantages described above, a side light type surface light source device has been proposed, in which a light scattering guide in the form of a rectilinear wedge with a primary light source arranged around the thicker side face. FIGS. 1 and 1a are sections of the fundamental construction of such a proposed surface light source device.

Briefly explaining this device, reference numeral 1 denotes the light scattering guide having a straight wedge shape in section, having an incidence surface 2 and a light emission surface 3. A primary light source (fluorescent light) L is arranged near to the incidence surface 2. Around the light emission surface 3 is arranged a prism sheet 4 with prism surfaces 4a and 4b in a row and a flat outer surface 40 which serves as a luminous portion to produce a flux of illumination rays having a directivity. A known liquid crystal display device is arranged above the light scattering guide 1 to provide a liquid crystal display.

Reference letters R and S denote reflectors arranged around the rear face of the primary light source L and the rear face (inclined face) 5 of the light scattering guide 1. A silver foil of regular reflection may be usually used for the reflectors R and S.

The light scattering guide 1 consists of a transparent matrix made of, for example, polymethyl methacrylate (PMMA, refractive index of 1.492) and particulates (different refractive index particulates) having a refractive index different from that of the above matrix. For example, silicone type resin particulates are added to the matrix at a rate of 0.08 weight % as different refractive index particulates.

When the light scattering guide 1 constructed as above described is used, the light rays emitted from the light emission surface 3 have a preferentially propagating direction which directs forward but obliquely upward as viewed from the primary light source as described later. If a light ray proceeding in the preferentially propagating direction are referred to as "representative light ray" and designated by a letter "G", the angle $\zeta$ made by the propagating direction of the representative light ray with respect to the light emission surface 3 is 25° to 30° roughly estimated.

As shown in an enlarged figure of the encircled portion 50 in a broken line in FIG. 1a, if a prism sheet 4 having a vertical angle $\phi$ of around 60° to 65° (63° in the shown example) is used, the representative light ray G will be emitted in the direction substantially perpendicular to the outer surface 40 under the effect of the prism surfaces 4a and 4b.

With the surface light source device using such a light scattering guide 1 in the form of straight wedge, the level and uniformity in brightness as a surface light source will be improved by the repeated reflection effect occurring in the light scattering guide 1. The reason for achieving such an advantages will be summarily explained with reference to FIG. 2 illustrating the behavior of the light in the straight wedge-shaped light scattering guide 1 used in the arrangement in FIG. 1.

The light admitted through the incidence surface 2 into the light scattering guide 1 is representatively indicated by a light ray GO. It may be considered that the light ray GO forms a small angle with respect to the horizontal.

Considering the behavior of the light ray GO, it is scattered and varies in direction at a rate, while it reflects repeatedly at the light emission surface 3 as one major surface and the inclined surface 5 as the other major surface, whereby the light ray GO approaches to the thinner end of the light scatting guide 1. Since the reflections of the light ray GO at the surfaces 3 and 5 are regular reflections, the incidence and reflection angles at each reflecting position are of course equal ($\theta 1, \theta 2, \theta 3 \ldots$). It should be noted that the reflection angles at the light emission surface 3 are in a relation $\theta 2 > \theta 4 > \theta 6$.

Considering the interface transmittance at each reflection, a total reflection will occur under the condition of $\theta i > \alpha 1$ (critical angle; PMMA-air: 42°), and the transmittance will become higher rapidly when $\theta i$ becomes smaller than $\alpha c$. The transmittance becomes substantially constant if $\theta i$ is less than a certain small value (for instance, PMMA-air: around 35°). FIG. 2 illustrates an example where light rays G4 and G6 are emitted under the relation of $\theta 2 > \alpha c > \theta 4 > \theta 6$.

So long as the scattering caused in the light scattering guide 1 is forward scattering (the forward scattering characteristics of a light scattering guide will be explained later), such an effect will occur not only for the representative light ray GO (no scattering rays) entering the guide 1 through the incidence surface 2 at the shown angle but also for the most of the light rays propagating in the light scattering guide 1 substantially in the same manner. Therefore, the wedge-shaped sectional configuration of the light scattering guide 1 brings about a tendency in that the larger the distance from the light incidence surface 2, the higher is the rate of light emission from the light emission surface 3.

Estimated the effect improving the rate of light emission by a function f(x) of the distance x from the light incidence surface 2, the f(x) is an increasing function of x. On the other hand, a proximity effect with respect to the light source L will occur in the part near to the light incidence surface 2. Estimated the proximity effect by a function g(x), it is a decreasing function of the distance x from the light incidence surface 2.

Both functions considered, consequently, there is a tendency for the light emission surface 3 to emit light rays uniformly by canceling the decrease in the function g(x) and the increase in function f(x) each other. Moreover, opportunities for the light rays in the light scattering guide 1 to enter the light emission surface 3 will probably increase as a whole owing to the wedge-shaped configuration of the guide 1. Accordingly, a surface light source with an improved illuminance level is provided.

Use of a reflector of regular reflection (silver foil or the like) help the light rays, once transmitted through the rear surface of the guide 1, to enter the guide 1 again without diffusing. Therefore, the effect described above may become more prominent.

By using such a light scattering guide 1 having a sectional shape rectilinearly reducing its thickness from the thick light incidence surface facing to the primary light source in the manner described above, it is possible to provide a surface light source device of side light type superior in uniformity of brightness. Examples of actually measured light intensity distributions will be described later for proving the uniformity in brightness.

In recent years, however, there are increasing cases where a merely uniform brightness display hardly meets the user's requirements with increasing applications of liquid crystal displays and requirements for higher display performance.

For example, for game machines displaying three dimensional scenes in moving pictures and for personal computers for multimedia, the displays superior in presence effect and three-dimensional effect are strongly required. However, the uniform brightness over the entire display gives a flat impression which is poor in presence effect and three-dimensional effect. For displays in such applications, therefore, they may be required to maintain the uniformity in brightness to a certain extent and at the same time to have an intentionally given gradient of brightness or specified brightness distribution.

To meet such requirements, the surface light source device for backlighting has to provide an intentionally distributed light emitting intensity. An intentional distribution of emitting light intensity of a side light type surface light source device is accomplished by forming light scattering ink patterns on one major surface of a light guide or a light scattering guide, or by partially making the major surface rough.

However, such measures will increase the proportion of light rays which dissipate finally as unused light rays for lightening thereby lowering the efficiency of the surface light source device. The formation of the ink patterns and rough surface will increase the manufacturing cost.

SUMMARY OF THE INVENTION

It is an object of the invention to provide a surface light source device of side light type which is simple in construction and has a high efficiency in utilizing light rays and a controlled light emission intensity.

It is another object of the invention to provide a surface light source device advantageously applicable to back lighting for a liquid crystal display requiring presence effect and three-dimensional effect.

In a surface light source device of side light type including a plate-shaped light scattering guide having a volumetrically uniform scattering power and a primary light source arranged around one side of the light scattering guide, according to the invention, the light emitting surface (i.e. a major surface) is flat and the opposite surface (i.e. the other major surface) is provided with distributed inclinations depending on the distance from the incidence surface. At least a part of the latter major surface or inclined surface is inclined with respect to the light emission surface. The distribution of inclinations of the inclined surface is defined so as to permit the intensity of light rays emitted from the light emission surface to be changed depending on the distance from the light incidence surface.

As constructional components of the surface light source device of side light type, may be employed any one or both of a prism sheet and a light reflector element, the former modifying the propagation direction of illumination rays and latter being arranged on the opposite side of the prism sheet with respect to the light scattering guide. Primary light sources may be provided on both sides of the light scattering guide.

Various distributions may be adopted for inclinations of the inclined surface of the light scattering guide with respect to the light emission surface. According to one type of distribution, the inclination of the inclined surface with respect to the light emission surface continuously increases depending on the distance from the light incidence surface. For instance, the inclined surface is designed as a convex cylindrical surface.

According to another type, the distribution of inclinations of the inclined surface with respect to the light emission surface is divided into a plurality of sections depending on the distance from the light incidence surface. Inclinations at boundaries between these sections are preferably smoothly changed. The sections of inclination may comprise a straight inclined section and a convex cylindrical section.

In order to understand the fundamental light emission characteristic of the surface light source device of side light type using the light scattering guide, the scattering characteristic of the light scattering guide will be explained referring to Debye's theory.

When the light having an intensity IO has been transmitted through a distance y(cm) in a medium (light scattering guide) and the intensity has decreased to I during the transmission, the effective scattering irradiation parameter E is defined by the following equation (1) or (2).

$$E[cm^{-1}]=-[1n(I/IO)]/y \quad (1)$$

$$E[cm^{-1}]=-(1/I).dI/dy \quad (2)$$

The above equations (1) and (2) are so-called "integral form" and "differential form", respectively and are equivalent in the physical meaning. This E may be called "turbidity".

On the other hand, in the usual case that most of emitted light rays are longitudinally polarized lights for longitudinally polarized incidence lights, the scattered light intensity in the case causing light scattering owing to a nonuniform structure distributed in the medium (Vv scattering) is indicated in the following equation (3).

$$Vv = [(4<\eta^2>\pi^3)/\lambda_0^4] \int_0^\infty C\gamma(r)dr \quad (3)$$

In this case, $$C=[r^2\sin(\upsilon sr)]/\upsilon sr \quad (4)$$

In case of natural incidence light, it is known that the following equation (5) can be considered as scattering light intensity. The equation (5) is obtained by multiplying the right side of the equation (3) by $(1+\cos^2\phi)/2$ in consideration of Hh scattering.

$$Ivh=Vv(1+\cos^2\phi)/2 \quad (5)$$

where $\lambda O$ is wave length of incidence light, $\upsilon=(2\pi n)/\lambda O$, and $s=2\sin(\phi/2)$. Moreover, n is refractive index of the medium, $\phi$ is scattering angle, and $<n^2>$ is permittivity fluctuation square mean value ($<n^2>$ is represented by $\tau$ which will be suitably used hereinafter). The $\gamma(r)$ is a function called "correlation function". This correlation function $\gamma(r)$ is indicated by the following equation (6).

$$\gamma(r)=\exp(-r/a) \quad (6)$$

According to Debye's theory, the following equations (7) and (8) of relations among the correlation function $\gamma(r)$, correlation distance "a", and the permittivity fluctuation square mean value $\tau$ will be concluded, in the event that the nonuniform refractive index structure of the medium is dispersed divided in A and B phases with an interface therebetween.

$$a[cm]=(4V/S).\phi A\phi B \quad (7)$$

$$\tau=\phi A\phi B(nA^2-nB^2)^2 \quad (8)$$

In case that the nonuniform refractive index structure can be regarded as being constructed by a spherical interface having a radius R, the correlation distance "a" is given by the following equation (9).

$$a[cm]=(4/3)R(1-\phi A) \quad (9)$$

When natural light rays enter the medium based on the equation (5), the effective scattering irradiation parameter E is calculated using the equation (6) concerning the correlation function y(r). Results are as follows.

$$E=[(32a^3\tau\pi^4)/\lambda0^4].f(b) \quad (10)$$

where $$f(b)=[\{(b+2)^2/b^2(b+1)\}-\{2(b+2)/b^3\}.1n(b+1)] \quad (11)$$

$$b=4\upsilon^2a^2 \quad (12).$$

It will be understood from the above description that there are mutual dependence relations between the correlation distance "a", the permittivity fluctuation square mean value $\tau$ and the effective scattering irradiation parameter E.

FIG. 3 illustrates two curves representing conditions rendering constant the effective scattering irradiation parameter E in cases of E=50 cm$^{-1}$ and E=100 cm$^{-1}$, in a coordinate having an abscissa showing correlation distance "a" and an ordinate showing permittivity fluctuation square mean value $\tau$.

In general, if E is greater, the scattering power becomes larger, whereas if E is smaller, the scattering power becomes smaller. When E is 0, there is no scattering. From these facts, it is a general rule that when a light scattering guide is applied to a surface light source having a larger area, a smaller E should be selected, while when applied to a surface light source having a smaller area, a greater E should be selected.

Showing one standard, for example, if the effective scattering irradiation parameter E is of the order of 0.001 cm$^{-1}$, it is possible to give a uniform brightness to a very long light scattering guide having a length of a few tens meters. On the other hand, if E is of the order of 100 cm$^{-1}$ as shown in FIG. 3, it is suitable to illuminate a range from a few millimeters to a few centimeters uniformly. In the case of E=50 cm$^{-1}$ as shown in FIG. 3, it is probably suitable to give a uniform brightness to a light scattering guide having an intermediate size therebetween (for example, from a few centimeters to a few tens centimeters).

Considering the standard described above, a preferable range of the effective scattering irradiation parameter E is 0.45 cm$^{-1}$ to 100 cm$^{-1}$ for use in back lighting for liquid crystal displays having normal sizes.

On the other hand, the correlation distance "a" is closely related to the direction characteristics of scattering light in individual scattering phenomena in a light scattering guide. In other words, as can be supposed from the above equations (3) to (5), the light scattering in a light scattering guide has generally a forward scattering property whose degree changes depending on correlation distances "a".

FIG. 4 is a graph illustrating this fact with two values of the correlation distance "a" by way of example.

In the graph of FIG. 4, the abscissa represents scattering angles $\phi$ (assumed that the traveling direction of incidence light is $\phi=0$) and the ordinate represents scattering light intensity for natural light, namely, values of Vvh($\phi$)/Vvh(0) which are obtained by normalizing the equation (5) with respect to $\phi=0°$.

As shown in FIG. 4, in case of a=0.13 $\mu$m (particle diameter conversion value 2R=0.2 $\mu$m), the graph of normalized scattering light intensity gives a slowly reducing function of $\phi$. In contrast therewith, in case of "a"=1.3 $\mu$m (particle diameter conversion value 2R=2.0 $\mu$m), a graph of normalized scattering light intensity gives a rapidly reducing function in a range of small $\phi$.

Therefore, it can be concluded that the scattering caused by the nonuniform refractive index structure in a light scattering guide basically exhibits a forward scattering property, and the smaller the correlation distance "a" is, the weaker is the forward scattering property and the wider is the scattering angle range in scattering at one time. These facts have been experimentally ascertained.

The above discussion is based on the scattering phenomenon itself in the nonuniform refractive index structure distributed in a light scattering guide. In order to estimate the direction characteristics of light actually emitted from the light emission surface of a light scattering guide, it is needed to consider the phenomenon of total reflection at the light emission surface as well as the transmittance (rate of leaving from the light scattering guide) at the light emission.

As described in connection with FIG. 2, even if the light enters the light emission surface from the inside of the light scattering guide, any emission (escape) to the outside (the air layer) does not occur in the event that the incidence angle is in excess of the critical angle $\alpha c$ defined by refractive indexes of mediums inside and outside the light scattering guide (assuming that the direction of the normal at the light emission surface is 0°). With PMMA (refractive index of 1.492) which is a typical material used in the present invention, $\alpha c = 42°$. With other materials, the value of $\alpha ac$ is not greatly different from the above value (refer to Tables 1 and 2 latter described).

As described above, as the scattering in a light scattering guide generally has a forward scattering property, it is understood that a primary scattering light generated from a straightly traveling light from incidence surface seldom meet the above critical angle condition in a surface light source device as shown in FIG. 1, wherein the primary scattering occurs when the straightly traveling light encounters a nonuniform refractive index structure (for example, different refractive index particles).

In other words, it can be supposed that the formation of light rays meeting the above critical angle condition is in a close relation to the multiple scattering and reflection at a reflector disposed at the interface (or its near position) of the inclined surface of a light scattering guide. On the basis of this fact, the following matters are introduced with respect to the angle characteristics of emission light rays emitted from a light emission surface and emission light intensity characteristics depending on distances from a light incidence surface.

[1] Angle characteristics of light rays emitted from a light emission surface

So long as only the light ray meeting the above critical angle condition concerned, the forward scattering property which is an attribute of the individual scattering phenomena becomes weaker to a considerable extent so that the distribution of light traveling directions expands to an extent correspondingly. As a result, the direction characteristics of light rays emitted from a light scattering guide is greatly influenced by the angle dependence of transmittance (escape rate) of light rays meeting the critical angle condition at the light emission surface.

In general, the interface transmittance in case of scarcely meeting the critical angle condition is very low. For example, the interface transmittance at the interface between acrylic resin and the air is of the order of 40% for P-polarized light component, and 20% for S-polarized light component. When the incidence angle at the interface becomes less than the critical angle, the interface transmittance rapidly increases and becomes substantially constant when the incidence angle comes to a range less than the critical angle by more than 5° to 10°. For example, the substantially constant value for acrylic resin-air interface is more than 90% for P-polarized light component and 85% for S-polarized light component.

Thus, the right rays entering the light emission surface of a light scattering guide at incidence angles around 35°, roughly estimated, contribute most intensively to the emission of light rays from the light emission surface. In consideration of the refraction at the light emission surface, the light rays entering the light emission surface at incidence angles around 35° are emitted at angles around 60° to 65° with respect to the normal on the light emission surface (light scattering guides usually having refractive indexes around 1.5). In other words, roughly estimated, the right rays emitted from the light emission surface of a light scattering guide have a directivity in a direction rising around 25° to 30° with respect to the light emission surface. The value $\zeta$ previously described corresponds to this rising angle.

However, it should be noted that an excessively small correlation distance "a" give a weak directivity to the right rays emitted from the light emission surface because the forward scattering property becomes weaker so that the scattered light rays travel in a wide angle range after primary scattering. As a standard for preventing such a phenomenon from becoming prominent, the correlation distance "a" is preferably more than $0.01 \mu m$, and more preferably "a">0.05 $\mu m$. Such a property is referred to herein as "emitting directivity". A light scattering guide having such an emitting directivity may be preferably employed in the present invention.

[2] Emission light intensity characteristics depending on distances from the light incidence surface As clarified in the above explanation, the formation of light rays meeting the above critical angle condition is in close relation to the reflection from a reflector disposed at the interface, or its near position, of the inclined surface of a light scattering guide.

If the sectional configuration of the light scattering guide in the form of a straight wedge as shown in FIG. 1 or 2 is modified to afford a distribution of inclinations of the inclined surface, the repeated reflections in the light scattering guide occur in different manners from that before being modified. As a result, the emission light intensity characteristics vary depending on distances from the light incidence surface. The present invention resides in the discovery that the emission light intensity depending on distances from the light incidence surface characteristics can be controlled by intentionally utilizing this phenomenon.

In general, the configuration of the distribution of inclinations of the inclined surface of a light scattering guide with respect to the light emission surface is freely selected according to required distributions of emission light intensity. With a configuration of the distribution of inclinations, the inclination of the inclined surface with respect to the light emission surface continuously increases depending on the distance from the light incidence surface. According to an example, the sectional shape of a light scattering guide is defined as a wedge having a circular arc on one side.

Such a sectional shape employed, it provides a tendency of emission light intensity from the light emission surface to increase depending on the distance from the light incidence surface. It is supposed that the repeated reflection effect previously described referring to FIG. 2 appears more prominently with an increasing distance from the light incidence surface.

In another pattern of distribution of inclinations, the inclined surface is divided into a plurality of sections and the transition of inclination is defined for each section. The transition of inclination at each of interfaces between the neighboring sections is preferably smooth. For example, the inclined surface may be formed by smoothly connecting a rectilinear inclined surface section and a convex cylindrical section.

In general, the larger inclination of the inclined surface of a light scattering guide with respect to the light emission surface tends to stimulate the light emission. Therefore, if the inclination of the inclined surface at the portion near to the light incidence surface is larger, the amount of light rays emitted from the emission surface thereabout increases. On the other hand, if the increase in inclination of the part near to the light incidence surface is designed to be gentle, the amount of emission light rays from the part remote from the light incidence surface increases because a great amount of light rays are fed to the part remote from the light incidence surface.

Various distributions of emission light intensity are obtained by varying the transition in inclination of the inclined surface depending on the distance from the light incidence surface on the basis of such a principle.

The present invention is not limited by provision of a prism sheet or sheets, or construction, arrangement or configuration of the prism sheet. This is because even if the conditions in connection with the prism sheet are changed, the distribution of emitted light intensity on the light emission surface is maintained fundamentally while the preferentially propagating direction of the illuminating light rays is changed.

The features of the invention described above and other features of the invention will be more clearly understood from the following description taken in connection with the accompanying drawings.

BRIEF DESCRIPTION OF DRAWINGS

FIGS. 1 and 1a are sectional views illustrating, by way of example, a fundamental construction of a surface light source device including a light scattering guide in the form of a rectilinear wedge and a primary light source arranged around one side of its thicker end;

FIG. 2 is a view for explaining the behavior of light rays in the rectilinear wedge-shaped light scattering guide employed in the arrangement shown in FIG. 1;

DESCRIPTION OF THE INVENTION

Figure 3:
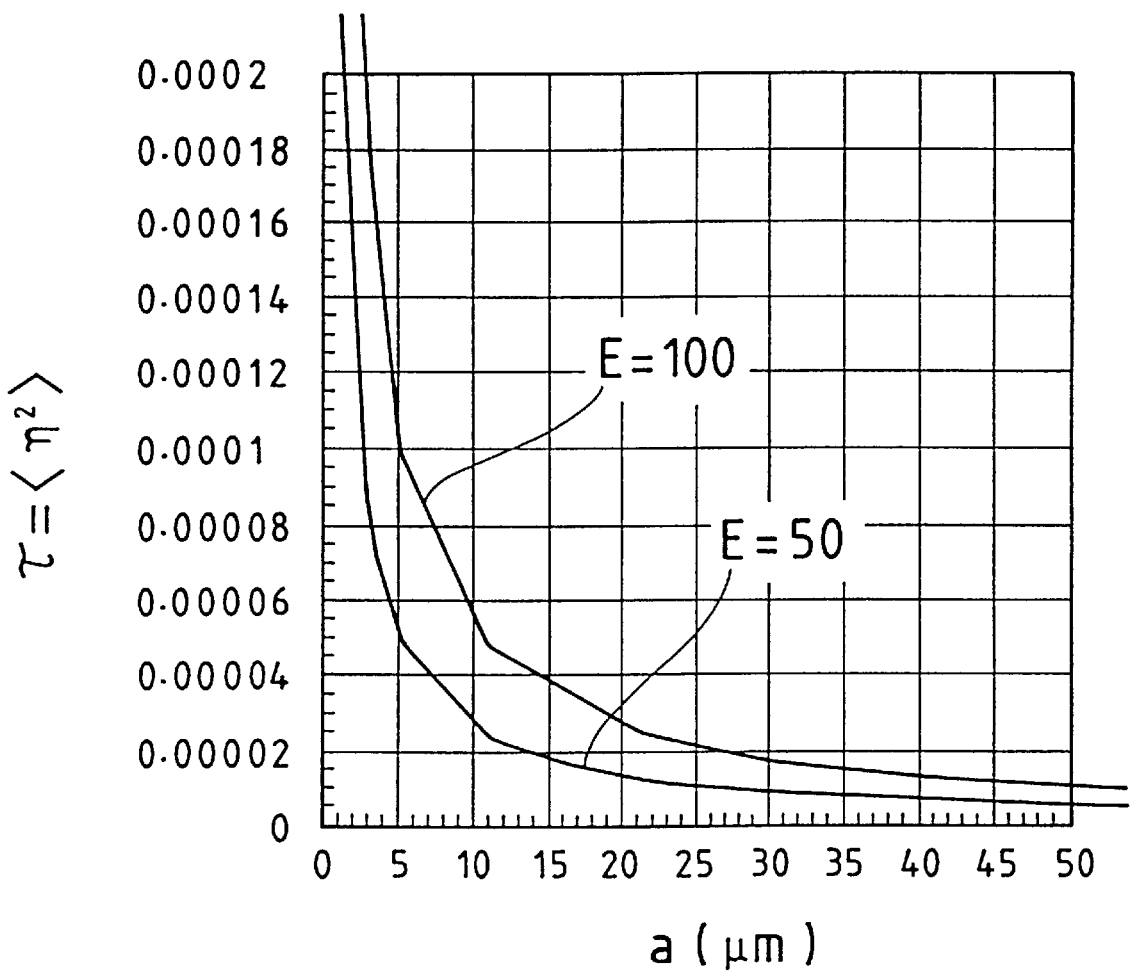
FIG. 3 is a graph, on a coordinate with the abscissa showing correlation distance "a" and the ordinate showing permittivity fluctuation square mean value $\zeta$, illustrating curves representing conditions for rendering constant the effective scattering irradiation parameter E in cases of E=50 cm$^{-1}$ and 100 cm$^{-1}$.
Figure 4:
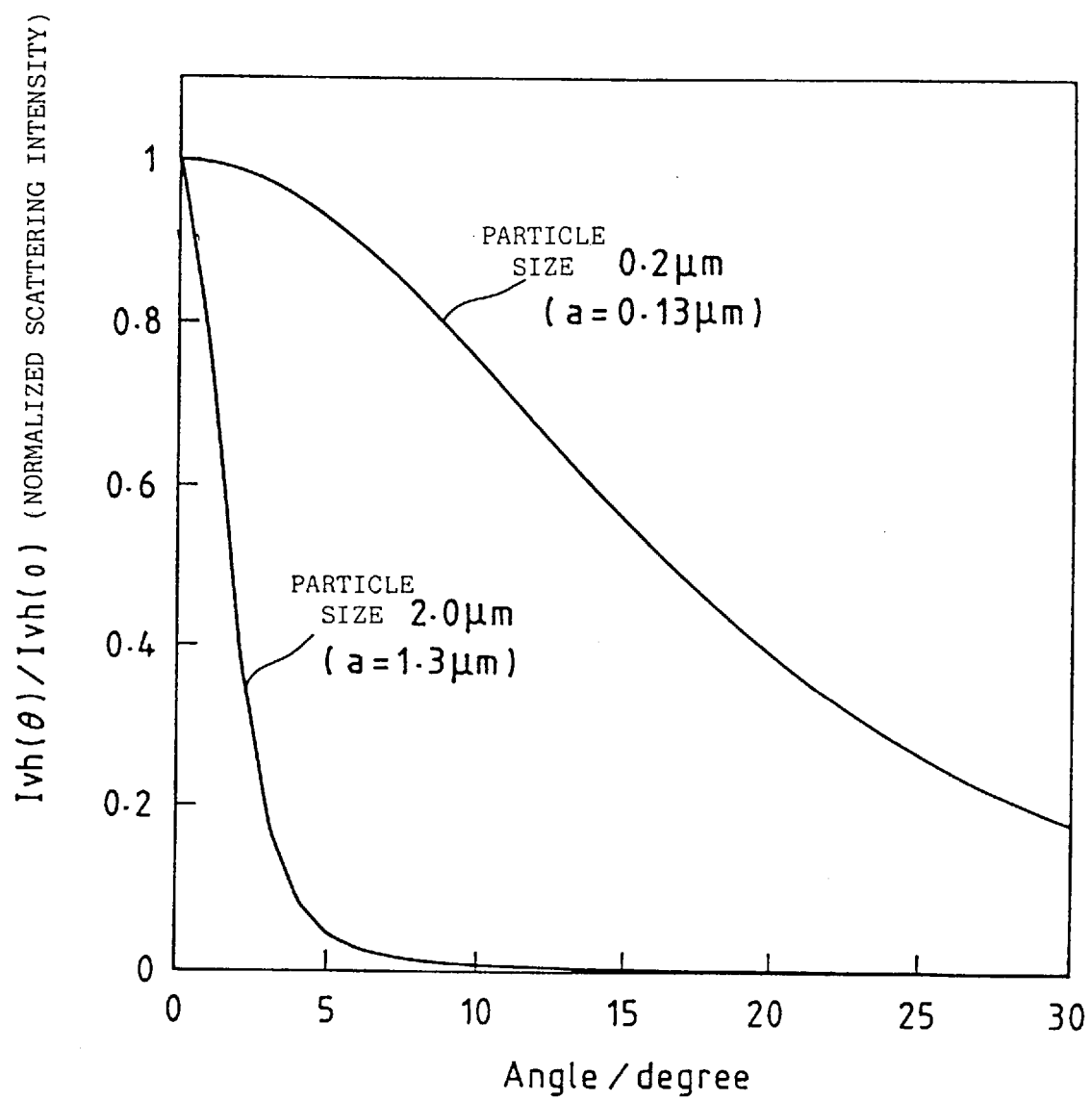
FIG. 4 is a graph for explaining the fact that the degree of forward scattering property in a light scattering guide varies depending on correlation distances "a"
Figure 5:
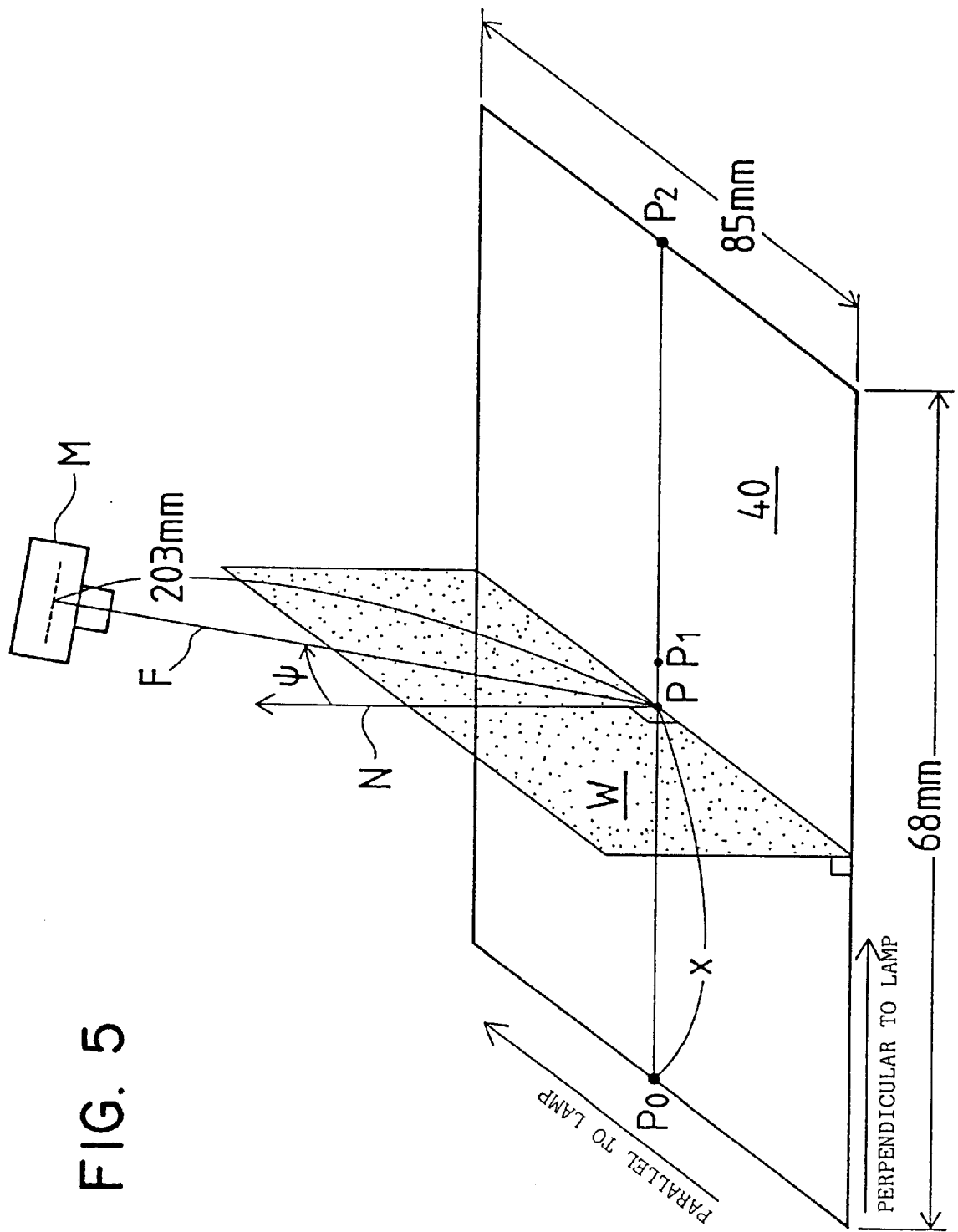
FIG. 5 is a view for explaining the conditions in measuring distributions of emitted light intensity by the use of a luminance meter with the reference example and the embodiments of the invention.

In order to clarify the essential features of the invention, light emission characteristics were measured under a common condition for embodiments of the invention and the surface light source device, as a reference example, shown in FIG. 1. FIG. 5 is a diagram explaining the arrangement in these measurements.

Referring to FIG. 5, reference numeral 40 illustrates the outer surface of a prism sheet employed in each of the surface light source devices in the measurements in the same manner as in FIG. 1. When the primary light source (L in FIG. 1) was switched on to form a luminous portion on the surface 40, its luminance was measured by means of a luminance meter M having a line of sight F (LS110, manufactured by Minolta Co., Ltd., field angle of view: ⅓°, provided with a close-up lens).

The place on the left hand side of the surface 40 in FIG. 5 corresponds to the position of the incidence surface of the light scattering guide (not shown). For the sake of convenience, the direction shown by an arrow along the side of the left end of the surface 40 is referred to as "lamp parallel direction" and the direction shown by another arrow perpendicular to the lamp parallel direction is referred to as "lamp perpendicular direction" hereinafter. The center of the left end side of the surface 40 is P0 while P2 is the point of intersection of a line extending in the lamp perpendicular direction from the center P0 with the right end side of the surface 40. The center of the two points P0 and P2 is P1 which is referred to as "central point".

The luminance meter M is arranged so that its line of sight F always intersects the line P0P2. The point of intersection of the line of sight F with the line P0P2 is a luminance measurement point indicated by P. A distance between the points P0 and P is x. A vertical surface W extends perpendicularly to the surface 40 and in the lamp parallel direction through the luminance measurement point P. When the luminance meter M is so positioned and directed that its line of sight F is in the vertical surface W, the line of sight F forms an angle $\Psi$ with the normal N to the surface 40 at the luminance measurement point P. In the actual measurement, the distance from the measurement point P to the reference plane of the luminance meter M was 203 mm (the distance in FIG. 5 is showed shortened for the sake of convenience for drawing).

In the measurements explained hereinafter, the luminance meter M is supported by a scanning mechanism (not shown)

enabling the meter M to move along the overall length between the measured points P0 and P2, with the angle Ψ being kept at a desired constant value for scanning. The surface 40 is of 68 mm×85 mm in all cases, which is equal to that of the light emission surface of the light scattering guide in each case. When the measurement point P is moved from the point P0 to the point P2, the distance x changes within the range from 0 mm to 68 mm. The distance x is referred to hereinafter as "scanning distance".

Figure 6:
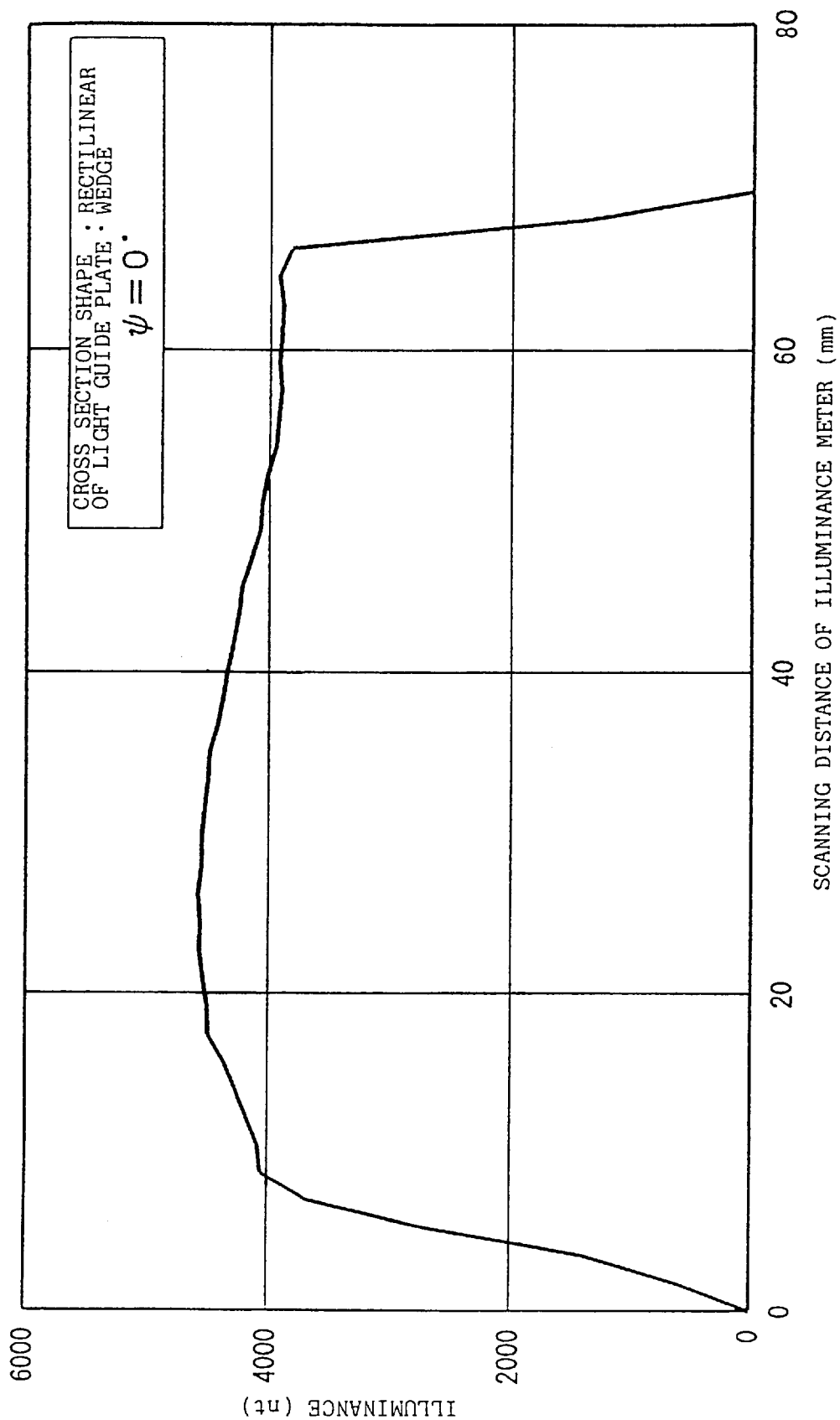
FIG. 6 illustrates the result of a measured distribution of emitted light intensity under the condition of $\Psi=0°$ with the reference example.
Figure 7:
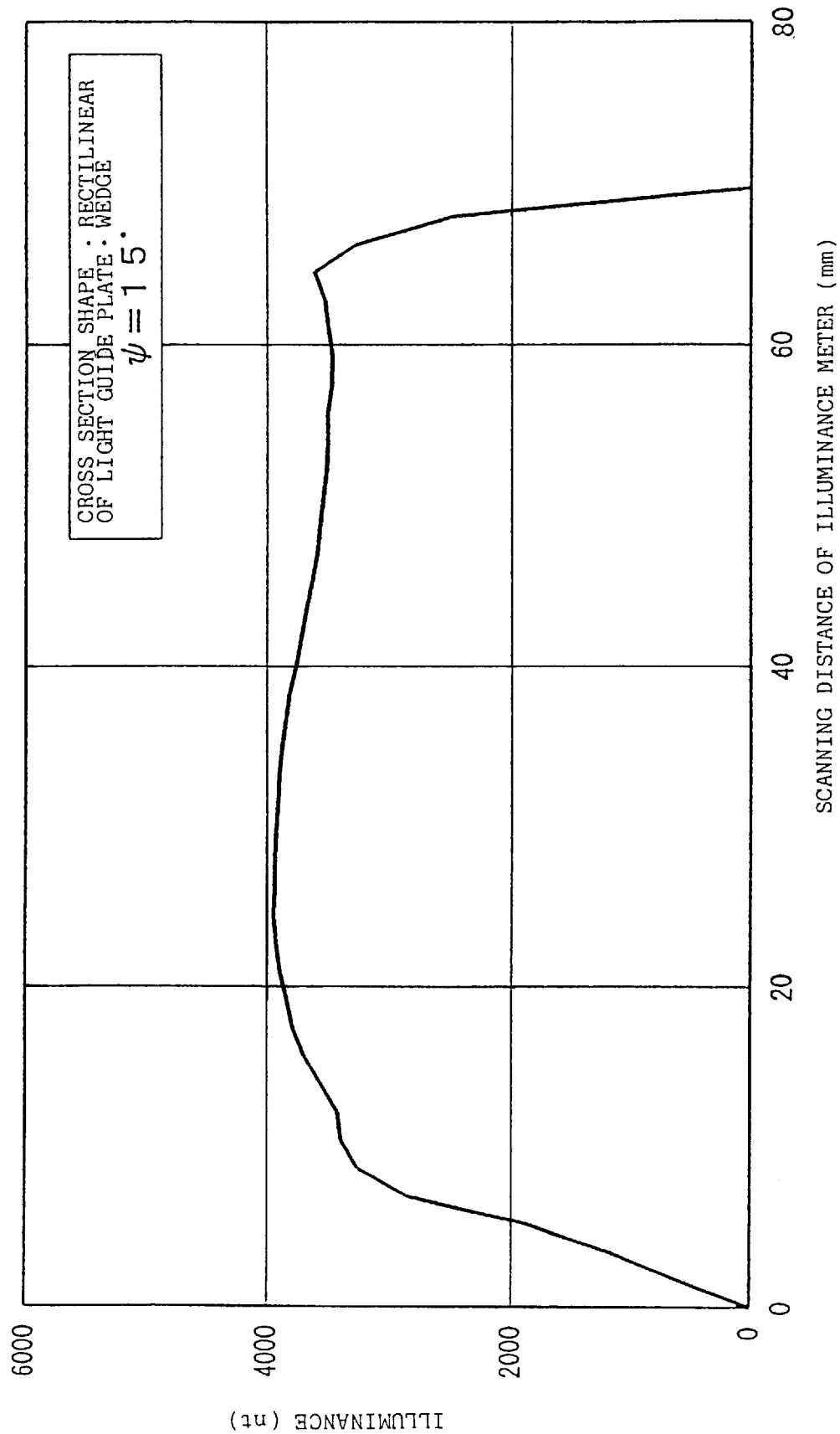
FIG. 7 illustrates the measured distribution of emitted light intensity under the condition of $\Psi=15°$ with the reference example.
Figure 8:
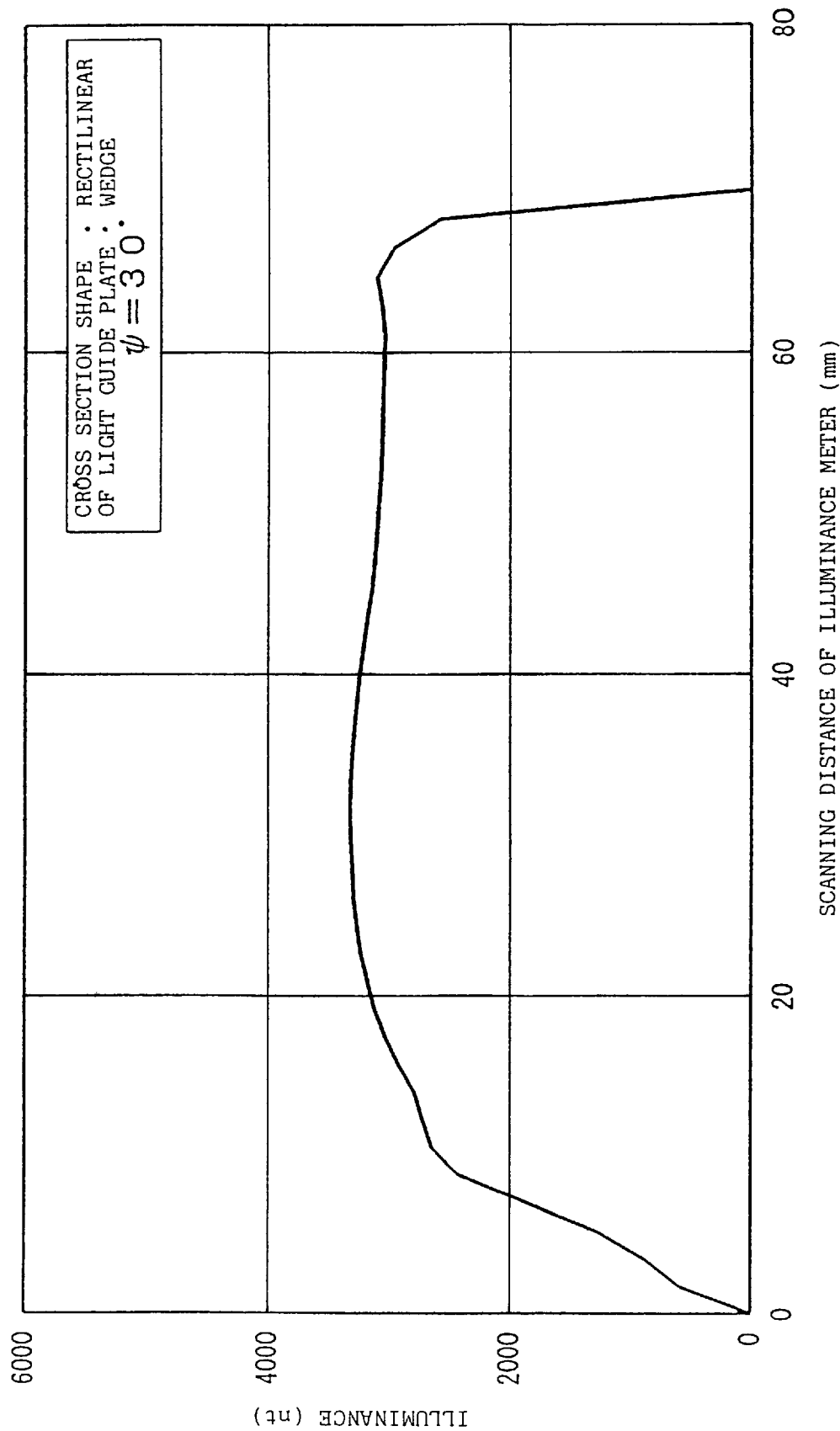
FIG. 8 illustrates the measured distribution of emitted light intensity under the condition of $\Psi=30°$ with the reference example.

FIGS. 6 to 8 are graphs showing the measured luminance distributions with the reference example employing the arrangement previously described (the surface light source device shown in FIG. 1). The angle Ψ is 0 (FIG. 6), 15° (FIG. 7) and 30° (FIG. 8). In each of the graphs, the abscissa indicates the scanning distance x(mm) and the ordinate indicates the luminance nt(=cd/m$^2$).

The light scattering guide (refer to numeral 1 in FIG. 1) used for the reference example has thicknesses of 4 mm at the thickest end (light incidence surface) and 0.2 mm at the thinnest end. Its light emission surface is of 68 mm (in the lamp perpendicular direction)×85 mm (lamp parallel direction). As a primary light source (refer to reference letter L in FIG. 1), a fluorescent light having a length of 150 mm and a tube diameter of 3 mm (150C; manufactured by Harrison Electric Co., Ltd. HMBS3) is arranged, which was switched on at lamp current of 6.0 mA by the use of an inverter (CXA-M10L; manufactured by TDK Co., Ltd.). The fluorescent light was shielded except the portion facing to the light incidence surface of the light scattering guide.

As can be seen from these graphs with the reference example, it has been found that the characteristics high in flatness can be obtained over the substantially overall length (over the scanning distance x from about 10 mm to about 65 mm) in the lamp perpendicular direction, although there are slight differences in luminance depending upon the angles Ψ.

Figure 9:
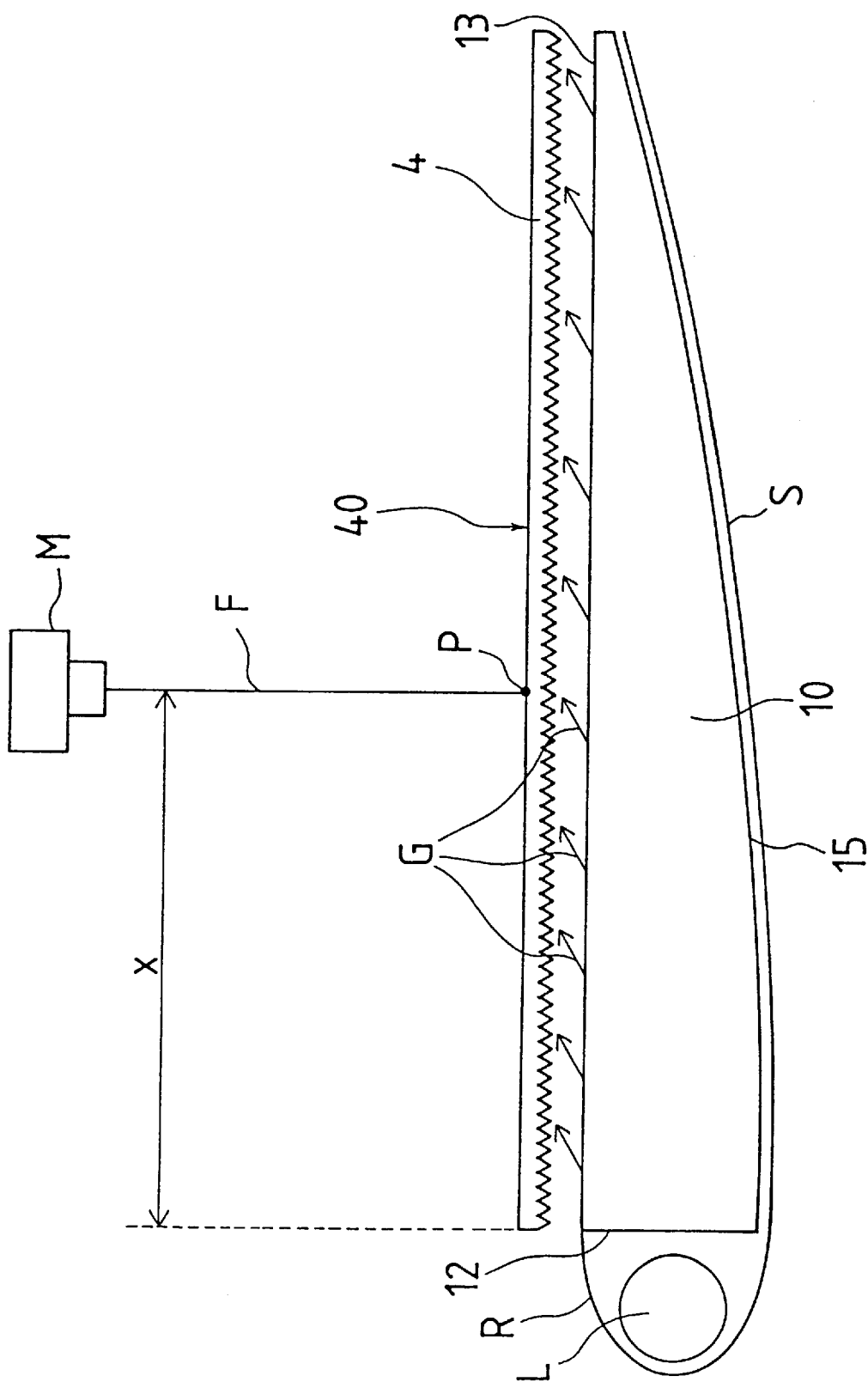
FIG. 9 is a sectional view for explaining the construction of the surface light source device according to the first embodiment of the invention.

FIG. 9 illustrates the surface light source device according to the first embodiment of the present invention in a sectional view in a similar manner to that of the reference example (FIG. 1). The common components are designated by reference numerals similar to those in FIG. 1.

The surface light source device according to the first embodiment of the present invention is different in construction from that of the reference example only in the sectional shape of the light scattering guide. The device of the reference example shown in FIG. 1 uses the straight wedge-shaped light scattering guide including the flat inclined surface 5 inclined with respect to the light emission surface 3. In contrast herewith, the device shown in FIG. 9 according to the first embodiment of the invention uses the light scattering guide 10 including a flat light emission surface 13 and an inclined surface 15 which is cylindrical in section, thereby forming a one-side arc wedge-shaped guide 10.

Referring to FIG. 9, the tangential direction of the inclined surface 15 around the leftmost end (the light incidence surface 12) of the light scattering guide 10 is substantially parallel to the light emission surface 13. However, as the distance from the incidence surface 12 becomes larger, the inclination of the inclined surface 15 in the tangential direction progressively becomes larger. The degree of the change in the inclination can be indicated by the change in radius of curvature of the convex cylindrical surface forming the inclined surface 15. The material from which the light scattering guide 10 was made is the same as that of the scattering guide of the reference example.

So long as the curvature of the inclined surface 15 does not become excessively large, it can be supposed that there is no essential difference in angular conditions between emitting from the light emission surface 13 and emission from the emission surface of the reference example. Then, the representative light ray G representing the light rays emitted from the light emission surface 13 is propagated in a direction which deviates obliquely upward with a rising angle around 25° to 30° in the same manner as in the reference example.

In the first embodiment, as the prism sheet 4 having a vertical angle φ of 63° is used, the representative light ray G is emitted in the direction substantially perpendicular to the outer surface 40 under the effect of prism surfaces 4a and 4b.

Figure 10:
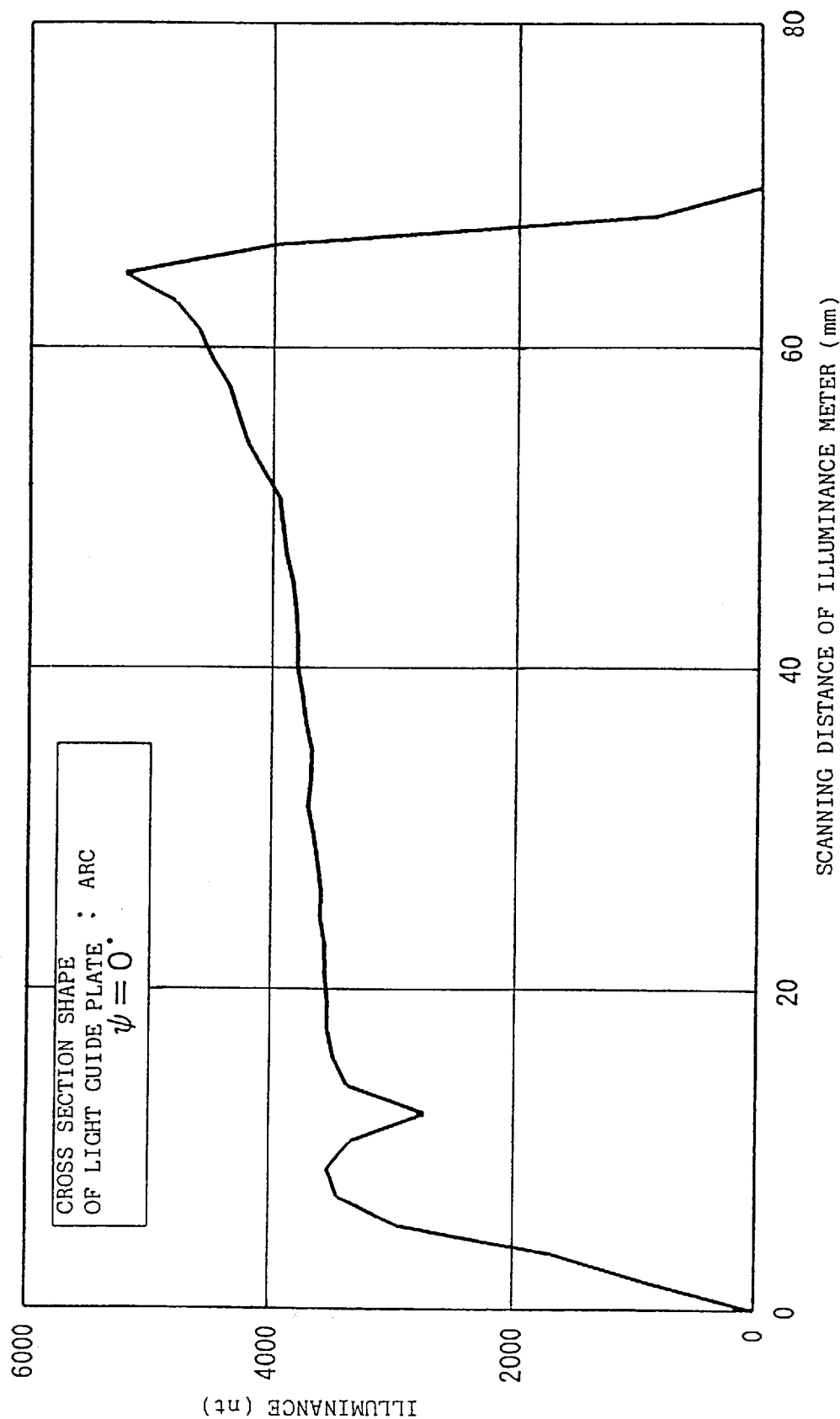
FIG. 10 illustrates the measured distribution of emitted light intensity under the condition of $\Psi=0°$ with the first embodiment of the invention.
Figure 11:
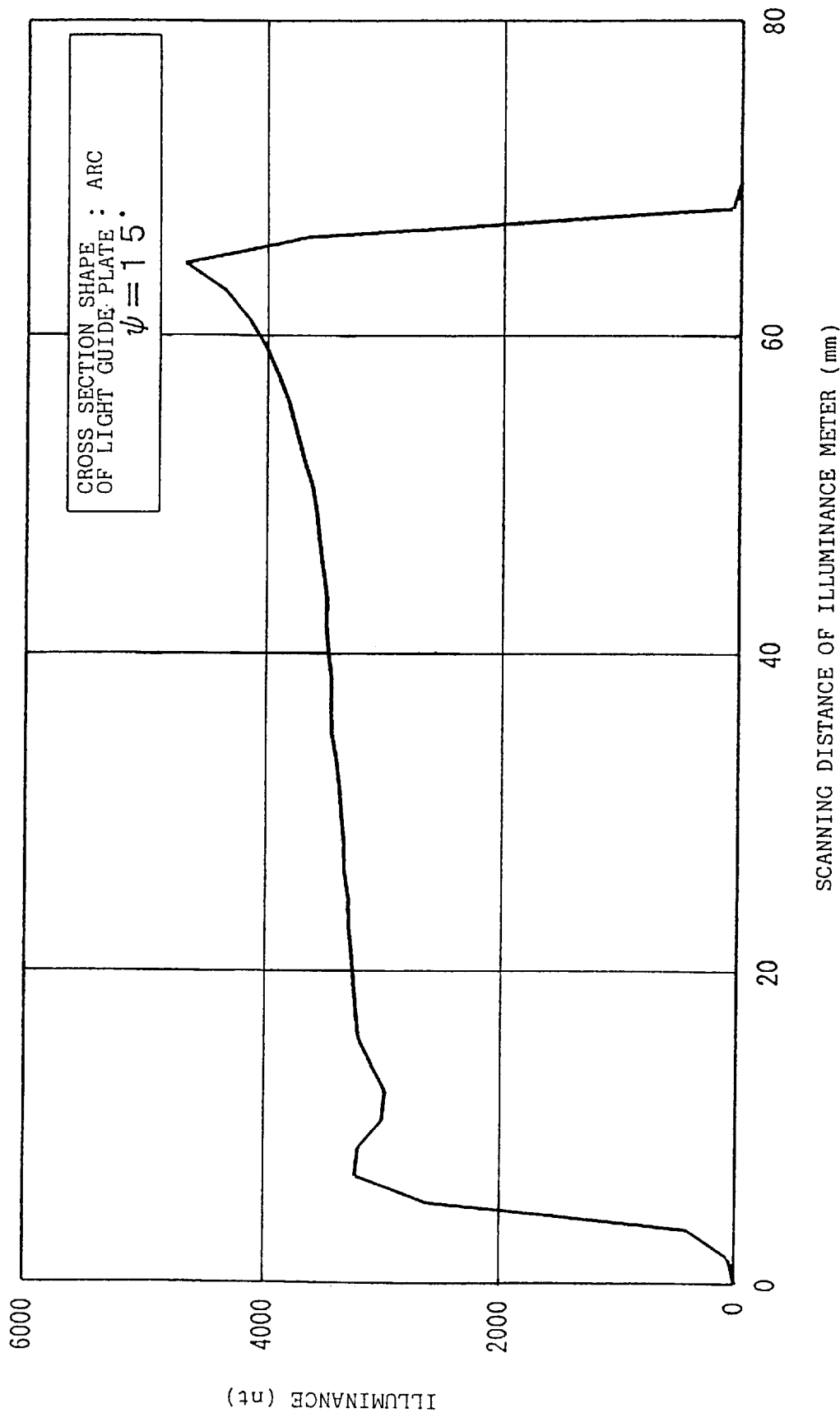
FIG. 11 illustrates the measured a distribution of emitted light intensity under the condition of $\Psi=15°$ with the first embodiment of the invention.
Figure 12:
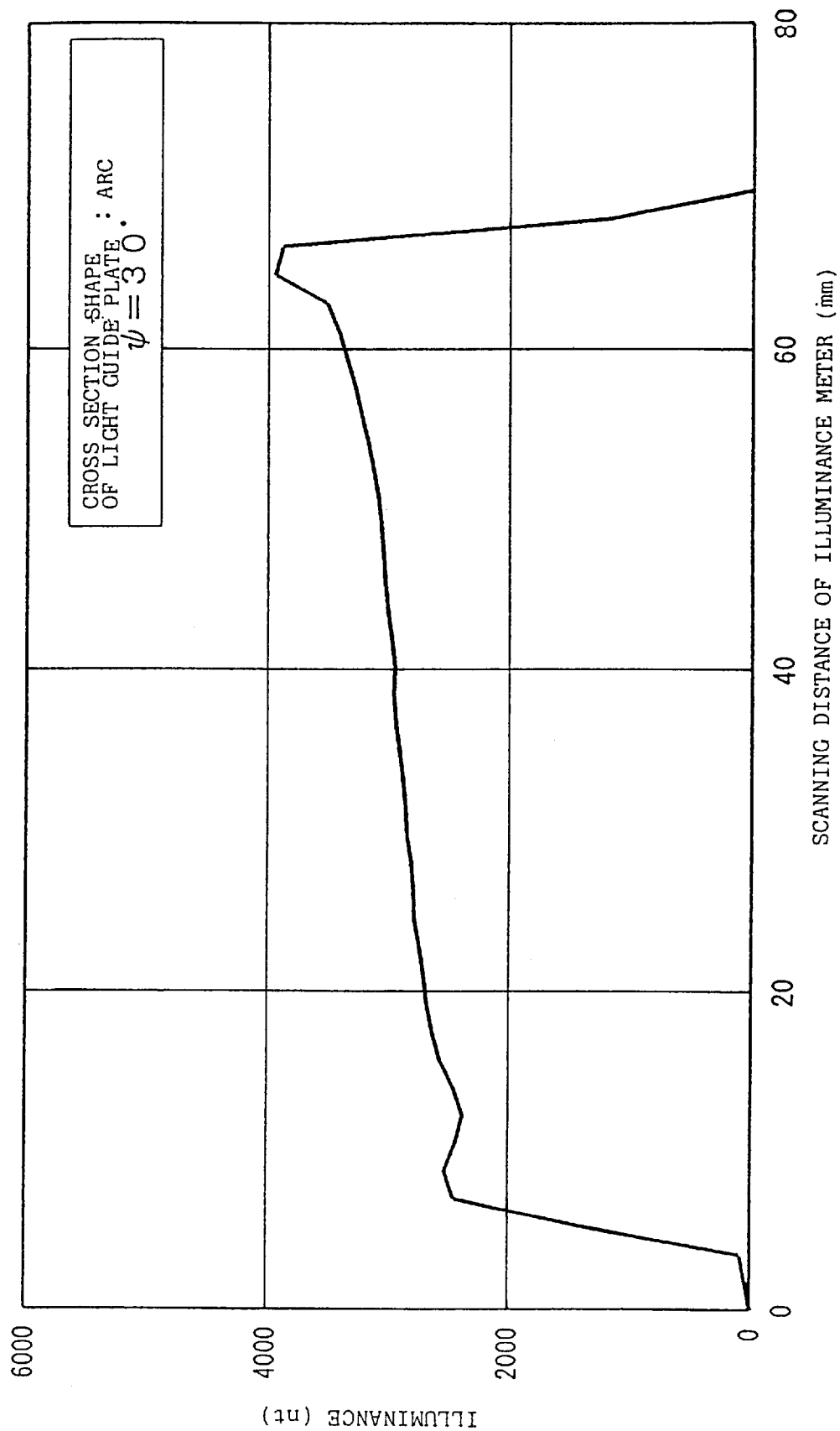
FIG. 12 illustrates the measured distribution of emitted light intensity under the condition of $\Psi=30°$ with the first embodiment of the invention.

In the surface light source device using such a light scattering guide 10 in the form of a wedge having the convex cylindrical inclined surface, repeated reflections occurring in the light scattering guide 10 are different from those in the reference example. As a result, the distribution of emitted light intensity aimed by the device according to the first embodiment will be different from that of the reference example. FIGS. 10 to 12 are graphs demonstrating the differences therebetween. The conditions for the measurements are the same as those in FIGS. 6 to 8 and, measured values of luminance on the outer surface 40 of the prism sheet 4 are plotted in the graphs. How to define the scanning distance x with respect to the line of sight of the luminance meter M and the measurement point P is also shown in FIG. 9.

The angle Ψ for inclining the luminance meter M in the vertical surface W extending in the lamp parallel direction is 0° (FIG. 10), 15° (FIG. 11) and 30° (FIG. 12). In each of the graphs, the abscissa indicates the scanning distance x(mm) and the ordinate indicates the luminance nt(=cd/m$^2$) as described previously.

The light scattering guide 10 used in the measurements has thicknesses of 4 mm at the thickest end (light incidence surface 12) and 0.2 mm at the thinnest end (these values are the same as those in the reference example). The radius of curvature of the cylindrical surface along the inclined surface 15 of the light scattering guide 10 is 1220 mm, such a cylindrical surface being formed for controlling the distribution of the emitted light intensity. The cylindrical arc in FIG. 9 is shown on an exaggerated scale.

The light emission surface of the light scattering guide 10 is of 68 mm (in the lamp perpendicular direction) x 85 mm (lamp parallel direction) similar to that of the reference example. As the primary light source L, a fluorescent light is used, which is equivalent to that used in the reference example, under the same conditions as those in the reference example.

As can be seen from these graphs in FIGS. 10 to 12, it has been found that there is a tendency of the luminance value to become higher progressively over the substantially overall length (over the scanning distance x from about 10 mm to about 65 mm) in the lamp perpendicular direction, although there are slight differences in luminance depending on angles Ψ. Such a tendency could not find in the results of the reference example shown in FIGS. 6 to 8.

It is supposed that this tendency results from the fact that the inclination of the inclined surface 15 becomes larger progressively with an increase in the scanning distance x and, accordingly, the repeated reflection effect explained with reference to FIG. 2 appears more prominently.

If the two surface light source devices according to the first embodiment of the invention are juxtaposed in opposition to each other, a twin type surface light source device can be obtained, which has a characteristic such that the brightness is very high at its center and progressively decreases toward both ends. In this case, two surface light source devices may be integrally connected to form a unitary device.

Figure 13:
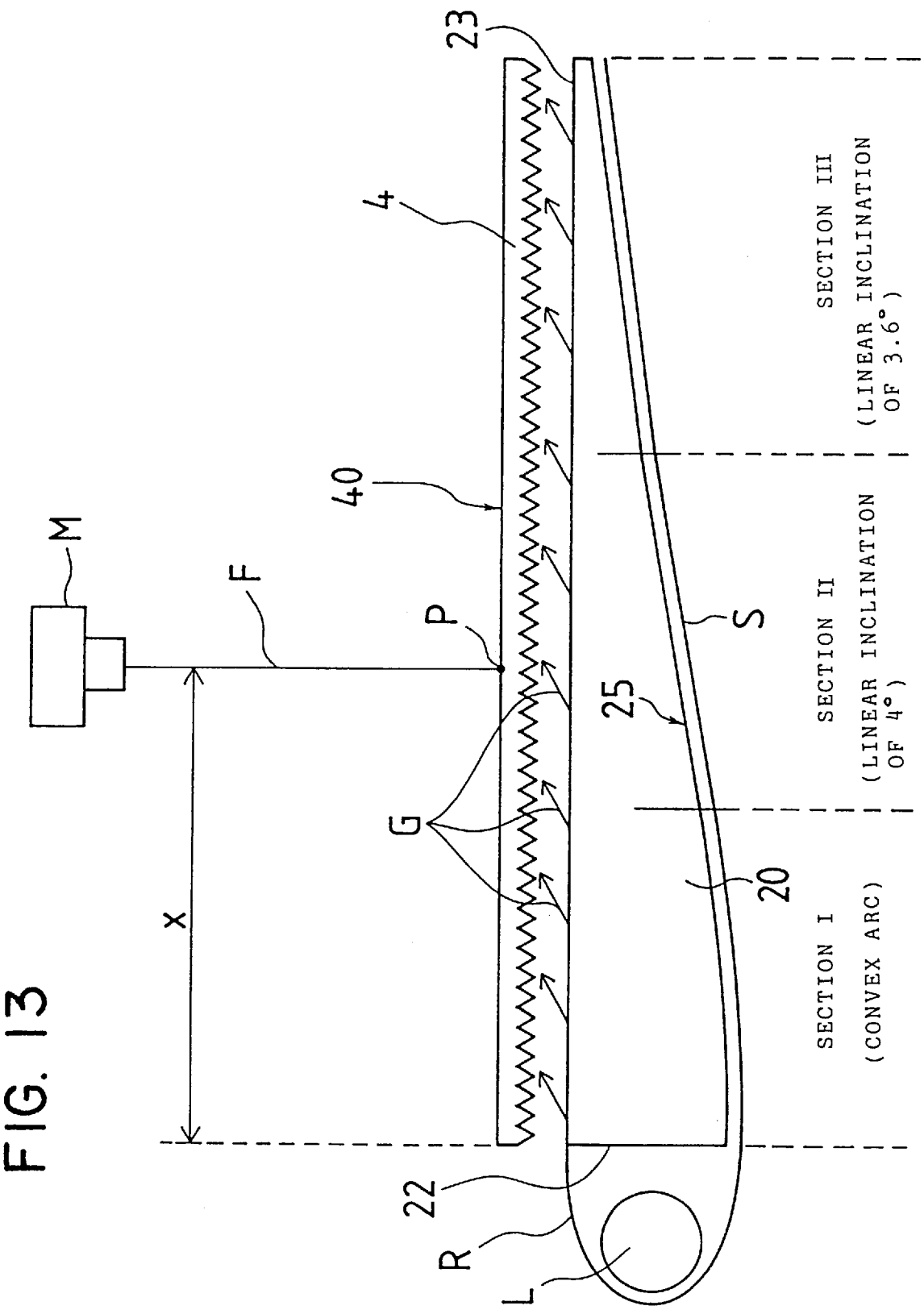
FIG. 13 is a sectional view for explaining the construction of the surface light source device according to the second embodiment of the invention.

FIG. 13 illustrates the surface light source device according to the second embodiment of the invention in a similar sectional view to those in FIG. 1 (reference example) or FIG. 9 (first embodiment). The common components are designated by the same reference numerals as those in FIGS. 1 and 9.

The surface light source device of the second embodiment is different from that of the first embodiment only in the sectional shape. The light scattering guide 20 used in the second embodiment has the inclined surface 25 whose sectional shape consists of following three sections. It should be noticed that the curvature of the circular arc and inclined angle of the inclined surface 25 are shown on an exaggerated scale.

Section I: (section from 0 mm to 23 mm in scanning distance x)

In the section I (convex cylindrical surface section), the inclined surface is a convex circular arc in section having a radius of curvature of 330 mm and the tangential direction at the end on the side of the light incidence surface 2 is parallel to the light emission surface 23. The tangential direction at the boundary between the sections I and II is at an angle of 4° with respect to the light emission surface 23.

Section II: (section from 23 mm to 46 mm in scanning distance x)

In the section II (inclined flat surface section), the inclined surface is straight and inclined at an angle 4° with respect to the light emission surface 23.

Section III: (section from 46 mm to 68 mm in scanning distance x)

In the section III (inclined flat surface section), the inclined surface is straight and inclined at an angle 3.6° with respect to the light emission surface 23.

In other words, the tangential direction of the inclined surface 25 at the leftmost end of the light scattering guide 20 is substantially parallel to the light emission surface 13 while the tangential direction progressively increases in the range from the incidence surface 22 to the position about one third of its overall length referring to FIG. 13. The radius of curvature of the circular arc (cylindrical surface) of the inclined surface in the section I is less than the radius of circular arc of the inclined surface 15 of the first embodiment. The inclination is constant (4°) in section I, although it changes into 3.6° at the boundary between the sections II and III. The inclination in the section III is constant (3.6°).

Figure 14:
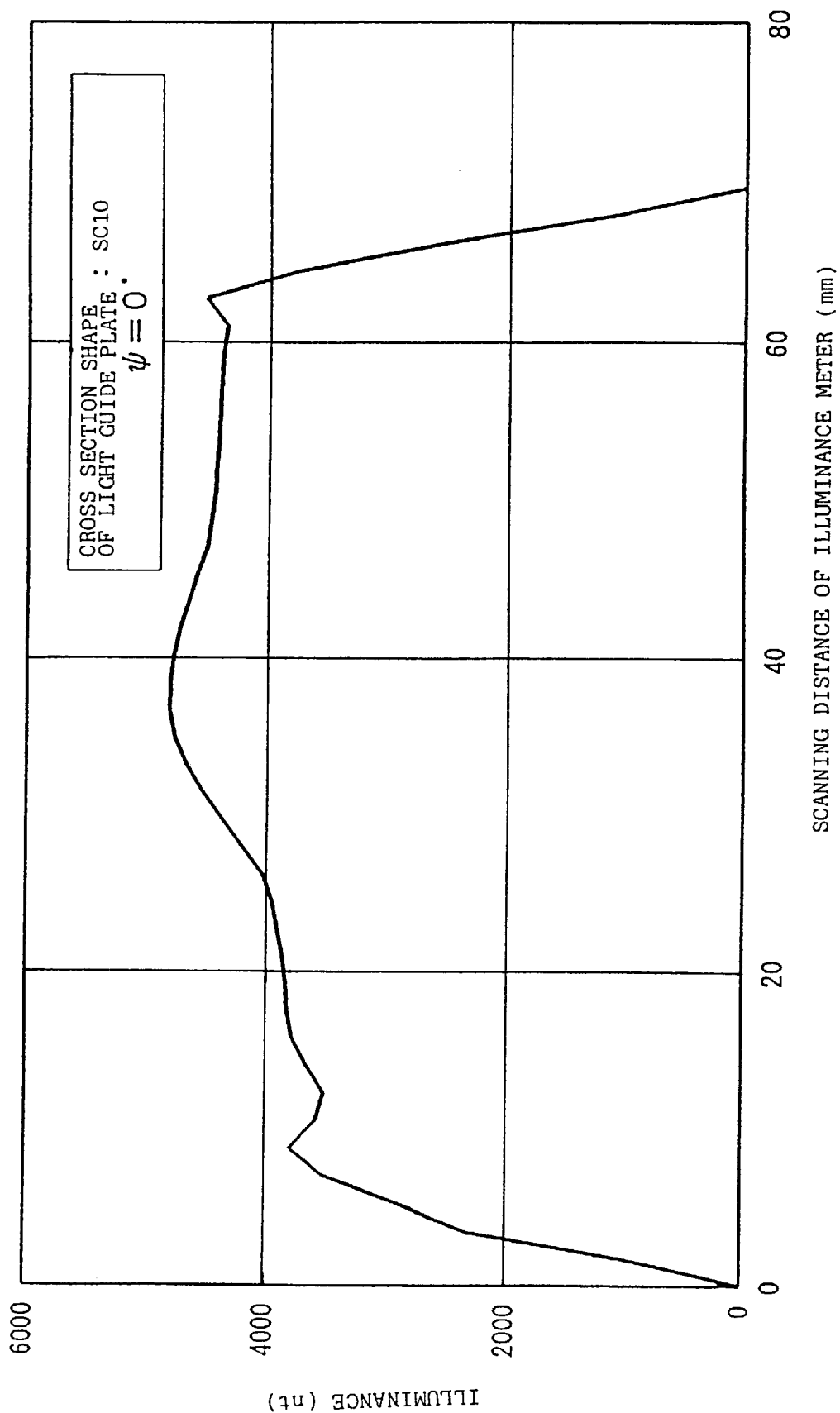
FIG. 14 illustrates the measured distribution of emitted light intensity under the condition of $\Psi=0°$ with the second embodiment of the invention.
Figure 15:
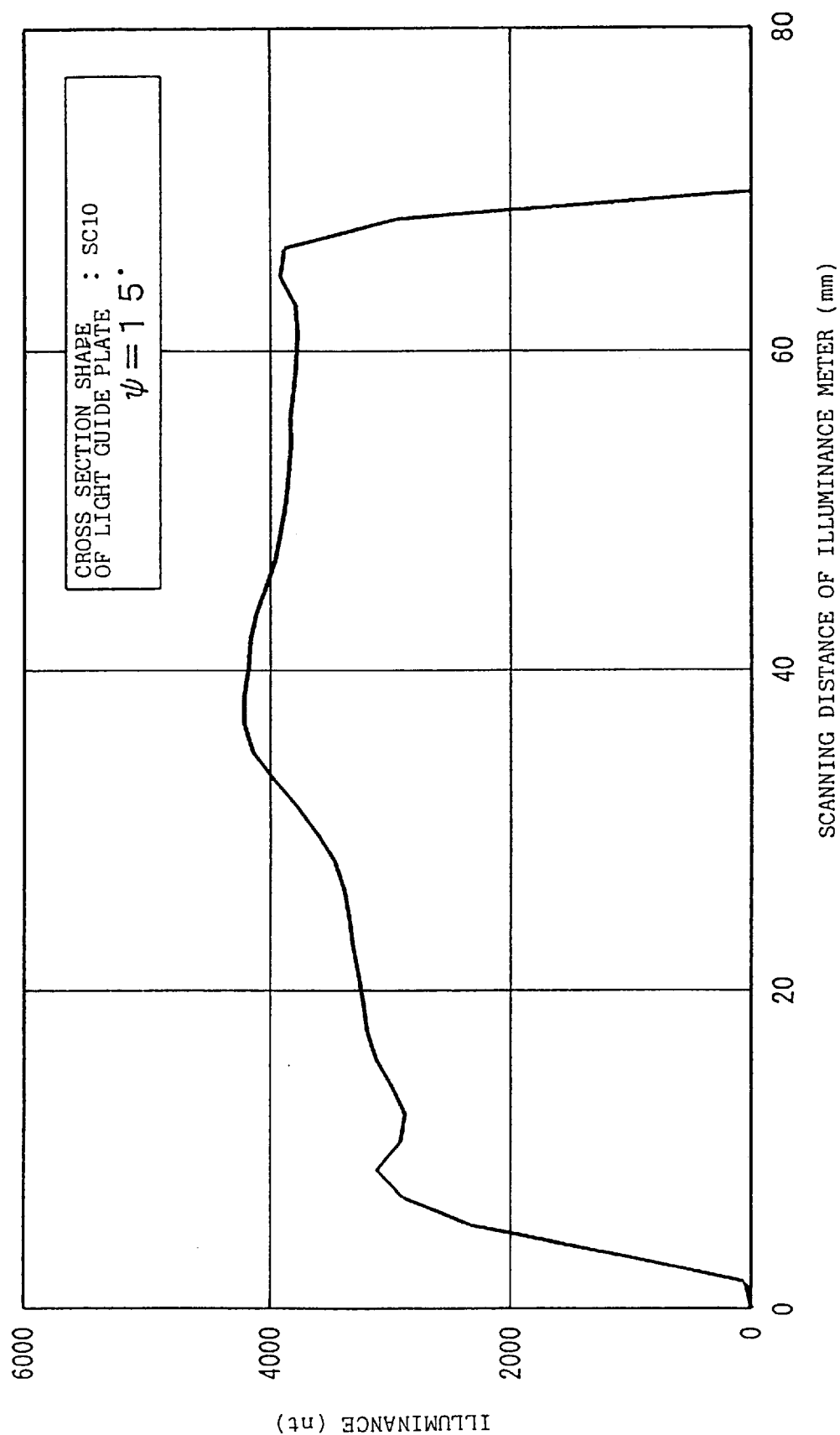
FIG. 15 illustrates the measured distribution of emitted light intensity under the condition of $\Psi=15°$ with the second embodiment of the invention.
Figure 16:
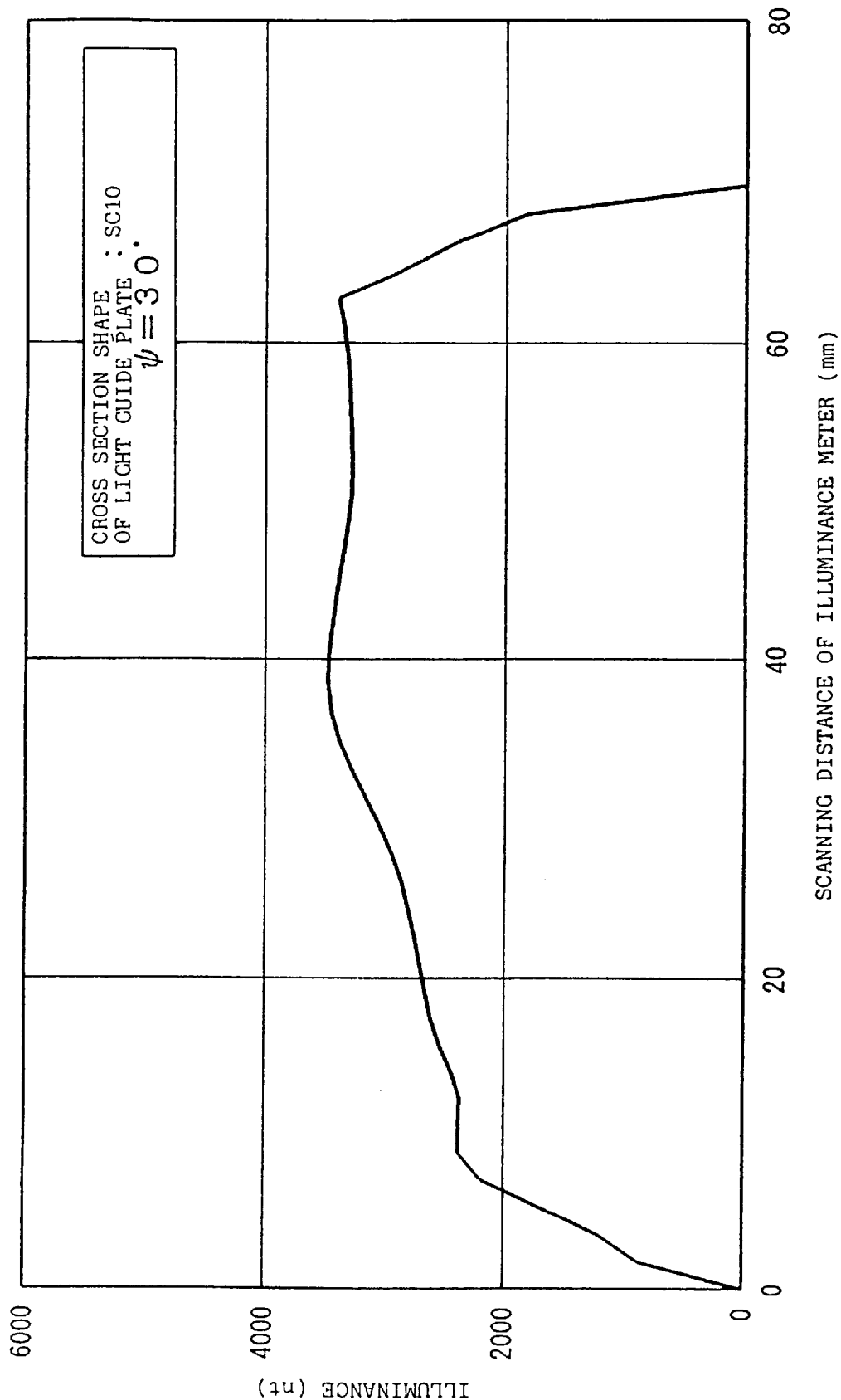
FIG. 16 illustrates the measured distribution of emitted light intensity under the condition of $\Psi=30°$ with the second embodiment of the invention.

With the surface light source device using such a light scattering guide 20, repeated reflections in the guide 20 occur in a manner different from those in the first embodiment and the reference example. As a result, the distribution of emitted light intensity is also accordingly different from those in the first embodiment and the reference example. FIGS. 14 to 16 illustrate graphs for demonstrating this fact.

The conditions for measurements are similar to those in FIGS. 6 to 8 and FIGS. 10 to 12 while measured values of luminance on the outer surface 40 of the prism sheet 4 are plotted in the graphs as functions of x. How to define the scanning distance x for the measurement point P and the line of sight of the luminance meter M is also shown in FIG. 13.

The angle $\Psi$ for inclining the luminance meter M in the vertical surface W extending in the lamp parallel direction is 0° (FIG. 14), 15° (FIG. 15) and 30° (FIG. 16). In each of the graphs, the abscissa indicates the scanning distance x(mm) and the ordinate indicates the luminance $nt(=cd/m^2)$ as described previously.

The light scattering guide 20 used for the measurements has thicknesses of 4 mm at the thickest end (light incidence surface 22) and 0.2 mm at the thinnest end (these values are the same as those in the reference example and the first embodiment).

The light emission surface of the light scattering guide 20 is of 68 mm (in the lamp perpendicular direction)×85 mm (lamp parallel direction) while a fluorescent light is used as the primary light source L, which is equivalent to those used in the reference example and the first embodiment, under the same conditions as those in the reference example and the first embodiment.

As can be seen from these graphs in FIGS. 14 to 16, it is understood that relatively higher luminance values are obtained on the range from the substantial center portion to somewhat on the right side thereof in the lamp perpendicular direction (over the scanning distance x from about 35 mm to about 40 mm), although there are slight differences in luminance depending on angles $\Psi$. Such a tendency could not find in any of the measured results of the reference example (FIGS. 6 to 8) and the first embodiment (FIG. 10 to 12).

It is supposed that this tendency results from the fact that the inclination of the inclined surface 25 increases relatively rapidly from the section I toward the section II and is kept constant in the section II and the repeated reflection effect explained with reference to FIG. 2 appears more prominently around the center portion.

Considering the above results of two embodiments, the following facts are understood in a general. A large inclination of the inclined surface with respect to the light emission surface of a light scattering guide urges the light emission from the light emission surface. Therefore, if the inclination of the inclined surface at the part near to the incidence surface is increased rapidly, the amount of light emitted from the part of the light emission surface near to the incidence surface will increases. Moreover, if the inclination of the inclined surface at the part near to the incidence surface is slowly increased, a great amount of light rays will be fed to the remote part from the incidence surface so that the amount of light emitted from the part of the light emission surface remote from the incidence surface will increase.

Therefore, by changing the configuration of the inclination of the inclined surface in various manners depending to the distance from the incidence surface, various distributions of emitted light intensity can be obtained accordingly. While the prism sheet is arranged so that its surface formed with prisms having the vertical angle of 63° faces to the light emission surface of the light scattering guide in the above embodiments, it will be apparent that none of the existence, constitution and arrangement of the prism sheet limit the invention.

This is because, even if the conditions in connection with the prism sheet are changed, the distribution of emitted light intensity on the light emission surface is not lost while but the preferentially propagating direction of the illuminating light rays is merely changed. For example, without using a prism sheet, a distribution of emitted light intensity having the similar tendency to those shown in FIGS. 10 to 12 and FIGS. 14 to 16 can be obtained only by effecting the measurement under the condition that the surface W including the line of sight F of the luminance meter M is inclined forward at an angle around 55° to 60° because the preferentially propagating direction of light rays emitted from the light emission surface directs obliquely upward with a rising angle around 25° to 30°.

Various kinds of polymer based materials may be used for making the light scattering guide used in the present invention. Typical materials are PMMA (polymethyl methacrylate), PSt (polystyrene), PC (polycarbonate) and the like as shown in the following Tables 1 and 2.

TABLE 1

| Category | Name of Polymer | Refractive Index |
|---|---|---|
| MA | 1. PMMA [polymethyl methacrylate] | 1.49 |
|  | 2. PEMA [polyethyl methacrylate] | 1.483 |
|  | 3. Poly(nPMA) [poly-n-propyl methacrylate] | 1.484 |
|  | 4. Poly(nBMA) [poly-n-butyl methacrylate] | 1.483 |
|  | 5. Poly(nHMA) [poly-n-hexyl methacrylate] | 1.481 |
|  | 6. Poly(iPMA) [polyisopropyl methacrylate] | 1.473 |
|  | 7. Poly(iBMA) [polyisobutyl methacrylate] | 1.477 |
|  | 8. Poly(tBMA) [poly-t-butyl methacrylate] | 1.463 |
|  | 9. PCHMA [polycyclohexyl methacrylate] | 1.507 |
| XMA | 10. PBzMA [polybenzyl methacrylate] | 1.568 |
|  | 11. PPhMA [polyphenyl methacrylate] | 1.57 |
|  | 12. Poly(1-PhEMA) [poly-1-phenylethyl methacrylate] | 1.543 |
|  | 13. Poly(2-PhEMA) [poly-2-phenylethyl methacrylate] | 1.559 |
|  | 14. PFFMA [polyfurfuryl methacrylate] | 1.538 |
| A | 15. PMA [polymethyl acrylate] | 1.4725 |
|  | 16. PEA [polyethyl acrylate] | 1.4685 |
|  | 17. Poly(nBA) [poly-n-butyl acrylate] | 1.4535 |
| XA | 18. PBzMA [polybenzyl acrylate] | 1.5584 |
|  | 19. Poly(2-ClEA) [poly-2-chloroethyl acrylate] | 1.52 |

TABLE 2

| Category | Name of Polymer | Refractive Index |
|---|---|---|
| AC | 20. PVAc [polyvinyl acetate] | 1.47 |
| XA | 21. PVB [polyvinyl benzoate] | 1.578 |
|  | 22. PVAc [polyvinyl phenyl acetate] | 1.567 |
|  | 23. PVClAc [polyvinyl chloroacetate] | 1.512 |
| N | 24. PAN [polyacrylonitrile] | 1.52 |
|  | 25. Poly(αMAN) [poly-α-methyl acrylonitrile] | 1.52 |
| α-A | 26. PMA(2Cl) [polymethyl-α-chloroacrylate] | 1.5172 |
| St | 27. Poly(o-ClSt) [poly-o-chlorostyrene] | 1.6098 |
|  | 28. Poly(p-FSt) [poly-p-fluorostyrene] | 1.566 |
|  | 29. Poly(o, p-FSt) [poly-o-, p-diflurostyrene] | 1.475 |
|  | 30. Poly(p-iPSt) [poly-p-isopropyl styrene] | 1.554 |
|  | 31. PSt [polystyrene] | 1.59 |
| C | 32. PC [polycarbonate] | 1.59 |

The light scattering guide made of such a polymer based material is produced by the following producing methods.

First, one method of them utilizes a molding process including a step of kneading two or more polymers.

In this method, two or more polymer materials having refractive indexes different from each other are mixed and heated to be kneaded (kneading step). The polymer materials before being kneaded may have any shapes. Pellet-shaped materials are preferable for industrial producing operations.

The kneaded liquid material is injected under high pressure into a metal mold and cooled so as to be solidified. The molded material is removed from the metal mold to obtain a light scattering guide corresponding in shape to the inner surface of the metal mold.

For example, using a metal mold having an inner shape corresponding to the sectional shape of the light scattering guide 10 shown in FIG. 9, a light scattering guide 10 to be used in the first embodiment is produced.

The above two or more kneaded polymers having refractive indexes different from each other in the above kneading step are solidified before being completely mixed with each other, thereby causing a nonuniformity (fluctuations) in local concentrations in its solidified body. As a result, a uniform scattering power is given to the produced light scattering guide.

Combinations and mixing rate of polymers in blending may be selected in a very wide range. They may be selected in consideration of difference in refractive index, degree and characteristics of nonuniformity in refractive index produced in the molding process (scattering irradiation parameter E, correlation distance "a", etc.). The typical polymer materials are shown in Tables 1 and 2.

In another method for producing the light scattering guide, particulate materials having different refractive indexes are uniformly mixed into a polymer material or materials. The difference in refractive index between the polymer material and particulate materials is preferably more than 0.001.

A method utilizable for uniformly distributing the particulate materials is called "suspension polymerization". According to this method, the particulate materials are mixed into a monomer so that polymerization reaction proceeds under suspended condition of the particulate materials in the hot water to obtain a polymer material uniformly mixed with the particulate materials. Such a polymer is employed as a source material to produce a light scattering guide having a required configuration.

The suspension polymerization is carried out with combinations of various particulate materials and a monomer (combinations of concentration of particles, particle diameters and refractive indexes) to prepare a plurality kinds of materials. These materials are selectively blended and the blended materials are then molded to produce light scattering guides having a variety of characteristics. Moreover, by further blending a polymer having no particulate material, the concentration of particles can be easily controlled.

According to another method utilizable for uniformly mixing and distributing the particulate materials, a polymer material and particulate materials are kneaded. In this case, kneading and molding (into pellets) with combinations of various particulate materials and a polymer (combinations of concentration of particles, particle diameters and refractive indexes) are effected to obtain a plurality kinds of materials. These materials are selectively blended and the blended materials are then molded to produce light scattering guides having a variety of characteristics.

The above polymer blending method may be combined with the particulate material distribution method. For example, when polymers having refractive indexes different from each other are blended and kneaded, particulate materials may be added into the polymers.

It will be easily understood from the above detailed explanation that the surface light source device of side light type according to the invention is simple in construction and operates with high efficiency in utilizing light rays and with characteristics such that the emission light intensity provides an intentionally produced distribution. These unique features are very advantageous for applying the surface light source device to back lighting for liquid crystal displays which are required to afford the presence effect and three-dimensional effect to viewers.

What is claimed is:

1. A surface light source device of side light type including a plate-shaped light scattering guide having a volumetrically uniform scattering power, and at least one primary light source arranged around one side of said light scattering guide, said light scattering guide including a light incidence surface for admitting light rays supplied from said primary light source, a flat light emission surface for emitting light rays from said light scattering guide and an inclined surface on an opposite side from said light emission surface, wherein said inclined surface has inclinations distributed depending on a distance from said light incidence surface in a manner such that a distribution of said inclinations is defined individually for a plurality of sections including a convex section near said light incidence surface and straight inclined sections around a central portion of said inclined surface so that intensities of light rays emitted from said light emission surface are the largest around an area corresponding to said central portion.

2. The surface light source device of side light type as set forth in claim 1, wherein said inclinations around boundaries of said sections are smoothly changed.

3. The surface light source device of side light type as set forth in claim 1, wherein said device further comprises a prism sheet disposed along said light emission surface for modifying propagation directions of said light rays emitted from said light emission surface.

4. The surface light source device of side light type as set forth in claim 2, wherein said device further comprises a prism sheet disposed along said light emission surface to modify propagation directions of said light rays emitted from said light emission surface.

5. The surface light source device of side light type as set forth in claim 1, wherein said device further comprises a reflector disposed along said inclined surface.

6. The surface light source device of side light type as set forth in claim 2, wherein said device further comprises a reflector disposed along said inclined surface.

7. The surface light source device of side light type as set forth in claim 3, wherein said device further comprises a reflector disposed along said inclined surface.

8. The surface light source device of said light type as set forth in claim 4, wherein said device further comprises a reflector disposed along said inclined surface.

* * * * *

UNITED STATES PATENT AND TRADEMARK OFFICE
CERTIFICATE OF CORRECTION

PATENT NO. : 5,810,464

DATED : September 22, 1998

INVENTOR(S) : Ishikawa

It is certified that error appears in the above-indentified patent and that said Letters Patent is hereby corrected as shown below:

Col. 7, line 21, change "$\alpha$ac" to --ac--.

Col. 8, lines 27-32, no indent [should be regular paragraph form].

Signed and Sealed this

Twentieth Day of April, 1999

Attest:

Q. TODD DICKINSON

*Attesting Officer*     *Acting Commissioner of Patents and Trademarks*